(12) United States Patent
James

(10) Patent No.: US 12,128,986 B2
(45) Date of Patent: Oct. 29, 2024

(54) POWER TRANSMISSION SYSTEM FOR A VEHICLE

(71) Applicant: Kelvin James, Edmonton (CA)

(72) Inventor: Kelvin James, Edmonton (CA)

( * ) Notice: Subject to any disclaimer, the term of this patent is extended or adjusted under 35 U.S.C. 154(b) by 513 days.

(21) Appl. No.: 17/483,750

(22) Filed: Sep. 23, 2021

(65) Prior Publication Data

US 2023/0091410 A1   Mar. 23, 2023

(30) Foreign Application Priority Data

Sep. 23, 2021 (CA) ................................ CA 3131737

(51) Int. Cl.
*B62M 1/14* (2006.01)
*B62K 21/00* (2006.01)
*B62K 3/00* (2006.01)
*B62K 5/023* (2013.01)

(52) U.S. Cl.
CPC ............... *B62M 1/14* (2013.01); *B62K 21/00* (2013.01); *B62K 3/005* (2013.01); *B62K 5/023* (2013.01)

(58) Field of Classification Search
CPC .......... B62M 1/14; B62K 21/00; B62K 5/023; B62K 3/005
See application file for complete search history.

(56) References Cited

U.S. PATENT DOCUMENTS

| | | |
|---|---|---|
| 2,152,518 A | 3/1939 | Wolff |
| 2,940,322 A | 6/1960 | Uhing |
| 3,046,801 A | 7/1962 | Pravel |
| 3,443,443 A | 5/1969 | Spence |
| RE27,711 E | 7/1973 | Steibel |
| 4,203,328 A | 5/1980 | DeBoynton |
| 4,718,291 A | 1/1988 | Wood et al. |
| 5,759,143 A * | 6/1998 | Blain ................. B29C 66/53247 53/133.4 |
| 5,899,476 A * | 5/1999 | Noyola .................... B62M 1/14 280/250.1 |
| 6,669,222 B1 * | 12/2003 | Barrett .................... A61G 5/026 280/250 |
| 8,651,507 B2 * | 2/2014 | Kylstra ................... A61G 5/027 280/250.1 |
| 9,056,035 B2 * | 6/2015 | Ju .......................... A61G 5/027 |
| D821,928 S * | 7/2018 | Bardina ...................... D12/133 |

(Continued)

OTHER PUBLICATIONS

Tsubaki Conveyor Chains; Product Catalog; published May 1994; 104 pages.

*Primary Examiner* — Kevin Hurley
*Assistant Examiner* — Marlon A Arce
(74) *Attorney, Agent, or Firm* — Frost Brown Todd LLP

(57) ABSTRACT

The power transmission system for a vehicle includes a side flex chain assembly that transmits rotational drive from a power transfer assembly to at least one direction wheel, resulting in propulsion of the vehicle. The orientation of the side flex chain in relation to the axis of the crank sprocket and the side flex chain sprocket and the convex inner face of the bushings of the side flex chain allow the side flex chain to twist when the at least one directional wheel turns left or the right without disengaging from the crank sprocket or the side flex chain sprocket. The power transmission system is designed to be used with a steering system that allows the power transfer assembly to remain substantially in the sagittal plane when steering.

8 Claims, 28 Drawing Sheets

(56) References Cited

U.S. PATENT DOCUMENTS

| | | |
|---|---|---|
| 10,011,321 B2 | 7/2018 | Kohlheb et al. |
| 11,072,386 B2 | 7/2021 | James |
| 2003/0178807 A1 | 9/2003 | Drymalski |
| 2011/0248466 A1 | 10/2011 | Leslie |
| 2014/0306420 A1* | 10/2014 | Schminkey .............. B62K 5/05 74/25 |

* cited by examiner

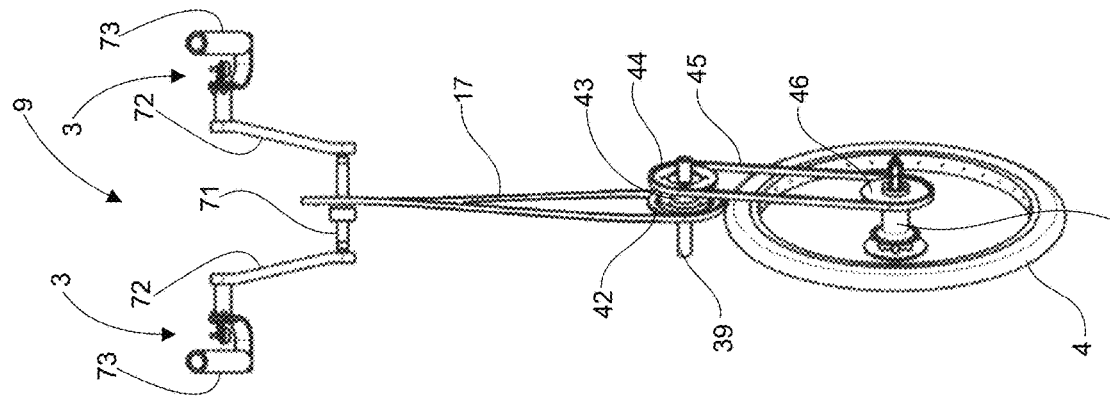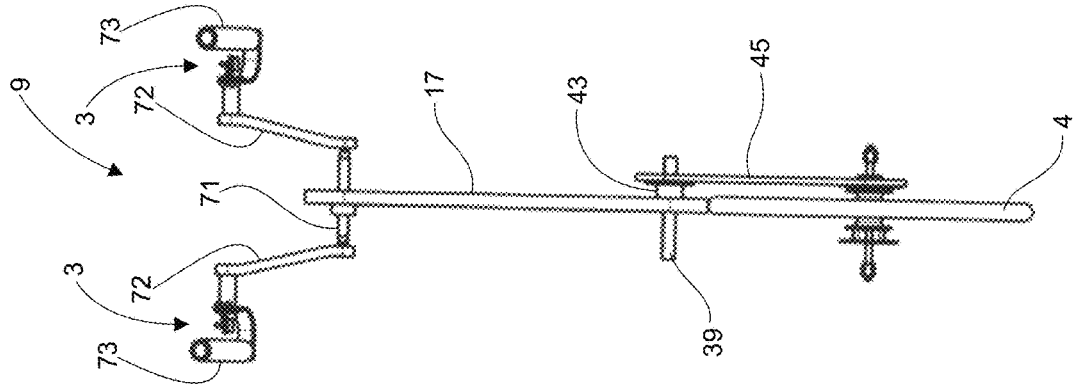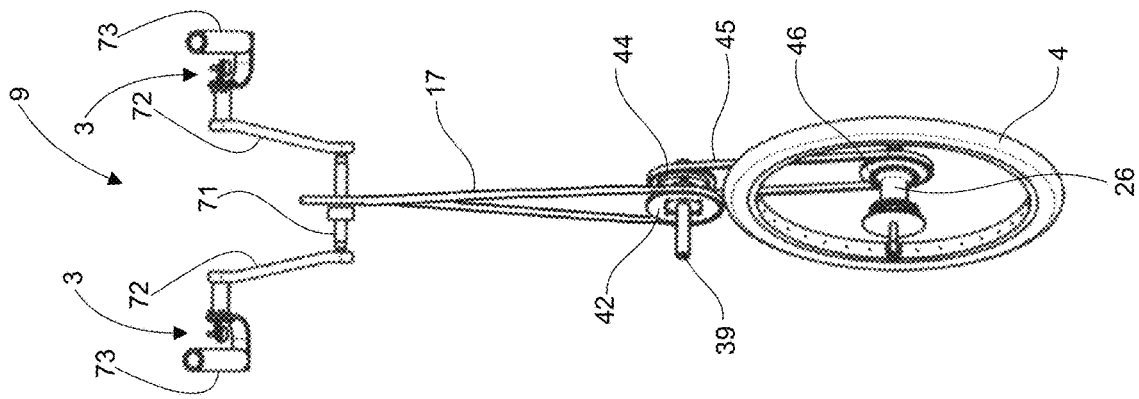
Figure 7A

*Section D-D*

Section C*

*Section A*

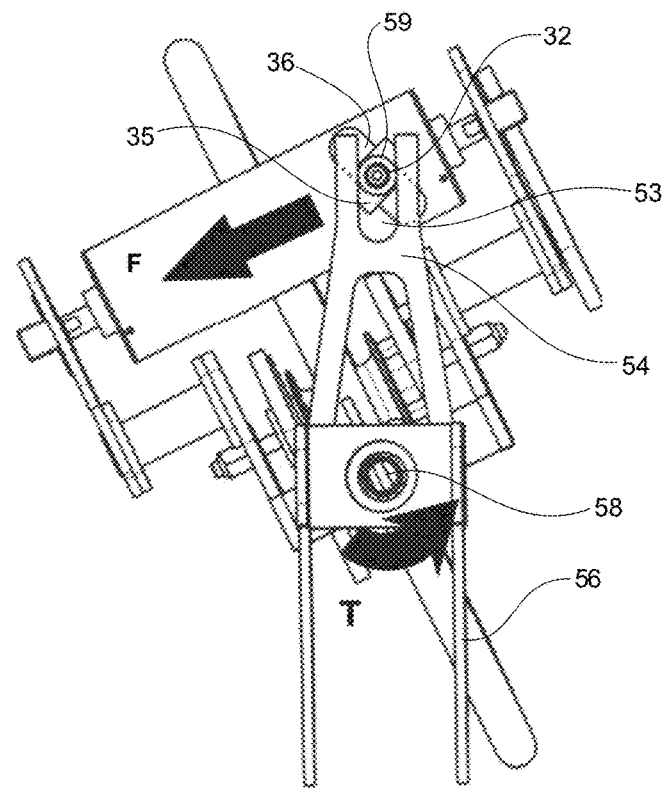
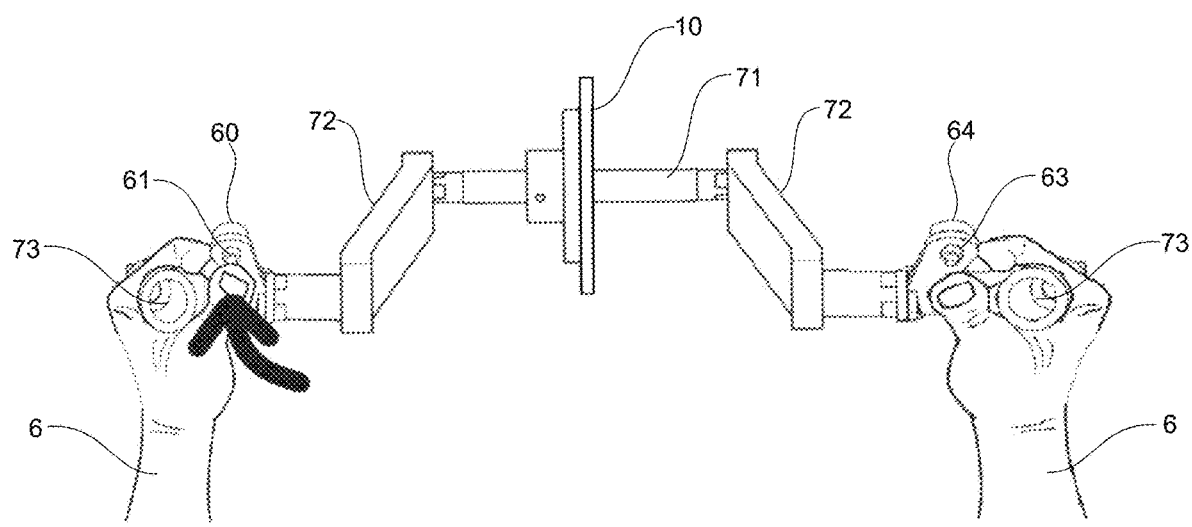
Figure 18

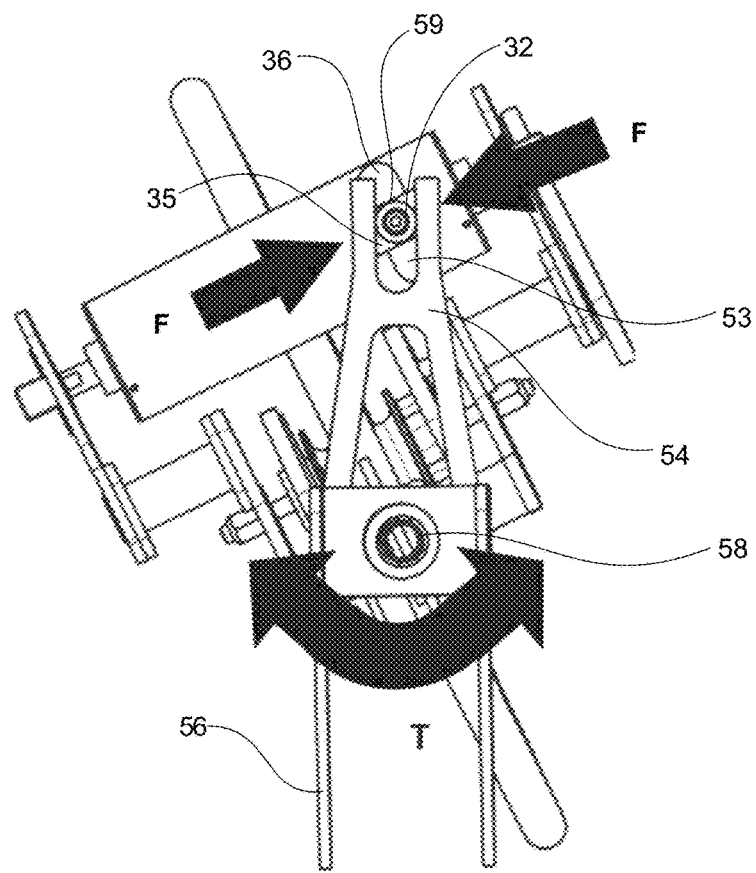
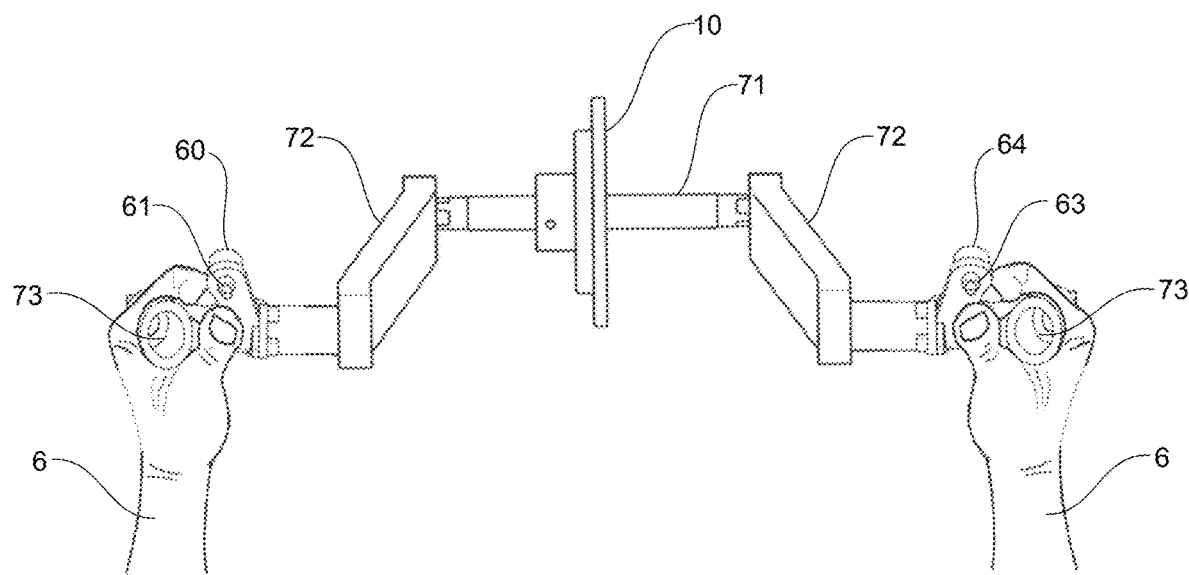
*Figure 19*

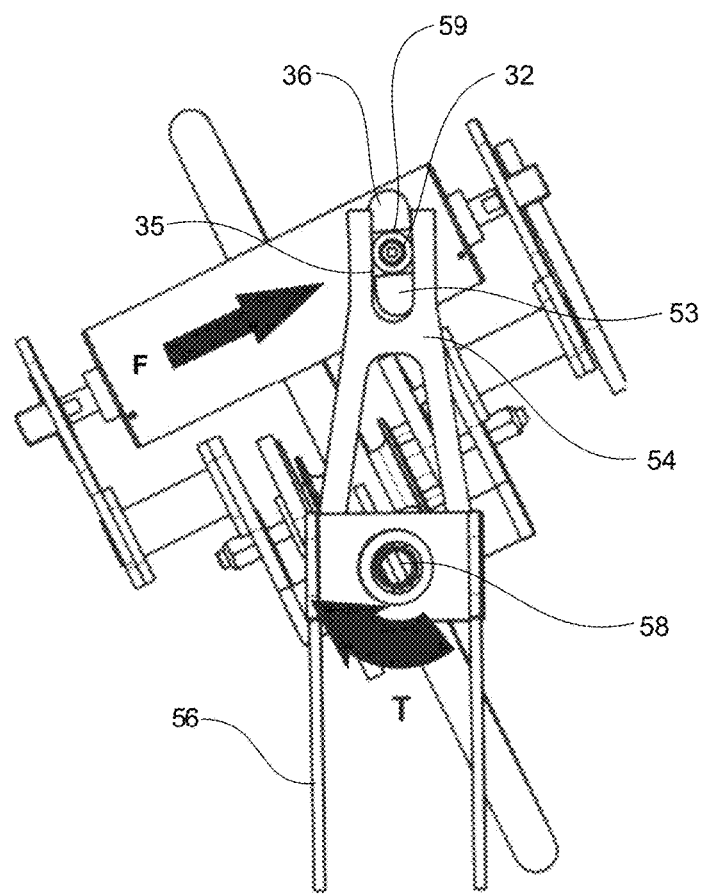
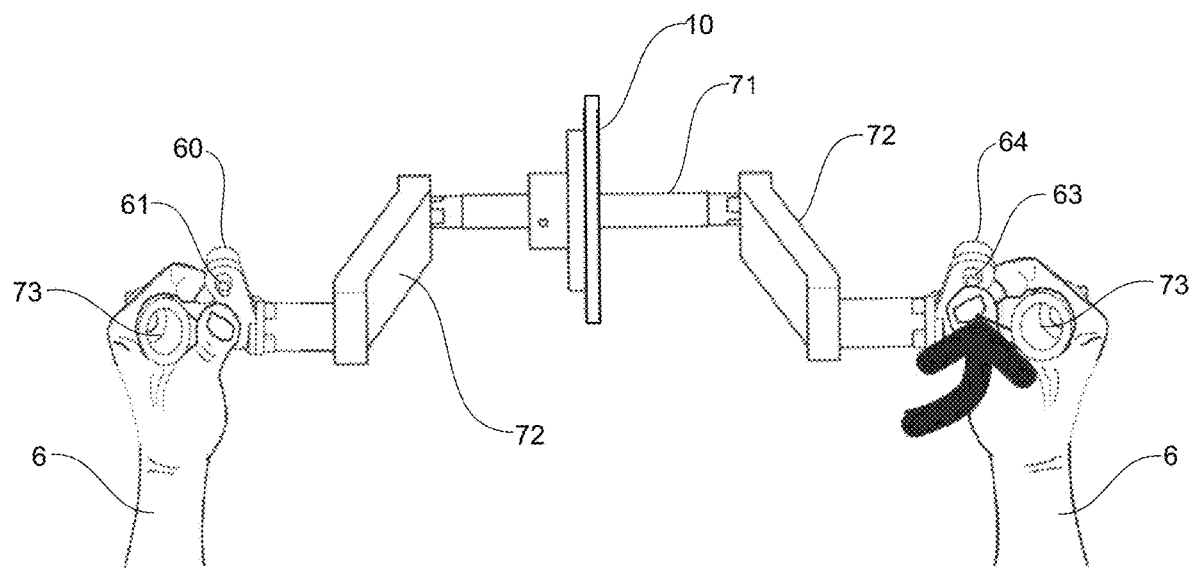
*Figure 20*

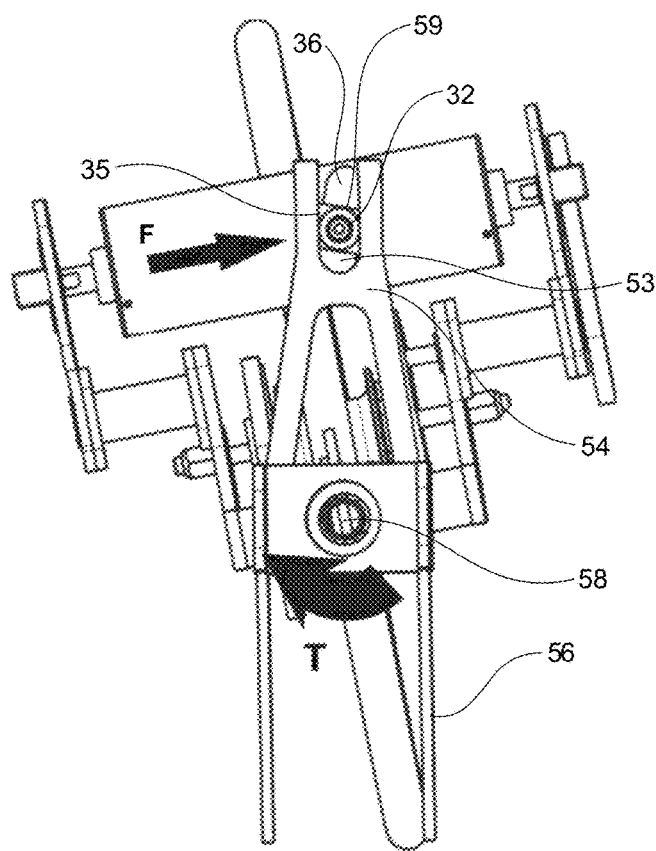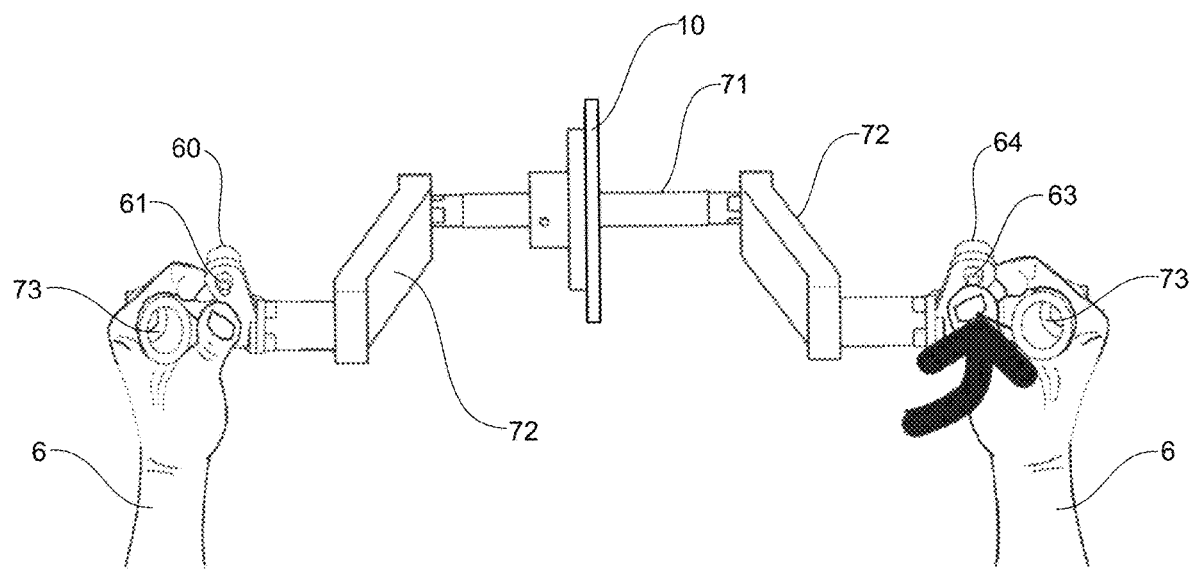
*Figure 21*

POWER TRANSMISSION SYSTEM FOR A VEHICLE

TECHNICAL FIELD

An apparatus and method for propelling at least one directional wheel of a vehicle, such as the front wheel of a tricycle.

BACKGROUND OF THE INVENTION

A vehicle normally has wheels, used for propulsion and steering. In the case of a wheel used for steering (referred to herein as a "directional wheel"), the support assembly on which the rotatable wheel is mounted pivots around a relatively vertical axis, thereby enabling the vehicle to travel in directions other than a straight line, i.e. around curves or corners. This pivoting or turning motion has a direction, clockwise or counter-clockwise, and a rate of speed. The pivoting motion is controlled or steered by the vehicle user.

Traditionally vehicles that are propelled manually by humans are powered by a users legs driving the rear wheel on the vehicle and steering is accomplished via the front wheel by turning a steering apparatus, for example handlebars, left or right. However, in certain situations it is preferrable to drive the front wheel of a vehicle rather than the rear wheel. For example, those who are paraplegic are not able to drive a vehicle with their legs. Driving a rear wheel of a vehicle with arms can be challenging in terms of how the chains and sprockets need to connect rearwardly to the driving wheel. It is much simpler to design the chains and sprocket connections to drive the front wheel when dealing with a hand powered vehicle. Moreover, there are known devices which essentially clip onto the front of a wheelchair and it is simpler to develop a device that drives the newly attached front wheel rather than attempting to install a mechanism that will drive the rear wheels of a wheelchair.

Because the front wheel is traditionally, and necessarily, the directional steering wheel, when it also becomes the driving wheel there are additional problems that arise. Typically, steering of a front driven vehicle occurs by turning a steering apparatus left or right, that this turning brings the hands of the individual riding the vehicle out of sagittal alignment of the user/rider. While this is not a major issue when using a rear driven vehicle, it causes problems when driving arm powered front wheel driven vehicles. The sagittal plane of a user/rider when seated in a front driven vehicle is parallel to the vertical longitudinal plane of the front driven vehicle itself.

The rotation motion of the crank arms has optimal power generation when steering is within the sagittal plane of the rider because the arms work in symmetry in the sagittal plane. However, when the crank arms are moved out of sagittal alignment during steering, and into the coronal plane, it becomes more difficult for the user to continue to cycle the crank arms at the same rate, making the rotating movement of the arms awkward and cumbersome and decreasing the efficiency of the power output during small steering angles. During large steering angles this misalignment of the crank arms with respect to the rider's sagittal plane causes a complete disruption of propulsion. Therefore, a user must coast until the steering angle returns to a small deviation from their sagittal plane so that they can again resume propulsion.

Moreover, this problem is not solved by simply using one arm to propel the vehicle via an arm crank system because this creates torque on the steering column thereby inadvertently turning the vehicle left or right during propulsion.

For vehicles with a front-mounted directional wheel, there are also problems associated with how to both steer and propel the vehicle. If the rider/user is using their arms to actuate the crank assembly, they would be largely unavailable to steer the vehicle. Otherwise stated, if propulsion and steering actions are to be simultaneously provided by the arms in the course of turning, one or both of these actions will be compromised. For example, propulsion may be compromised to allow the arms to achieve a full turning radius.

Therefore, there is a need for a power transmission system that can be used with a manually powered drive system that allows for steering and propulsion to occur at the least one front directional wheel of a vehicle. Additionally, if the manual powered drive system is arm powered, there is also a need to be able to produce power while keeping the users' arms generally in sagittal alignment by maintaining the arm cranks substantially parallel to the vertical longitudinal plane of the front driven vehicle.

SUMMARY

The present system is designed to enable the user of a manually powered, wheeled vehicle to steer and propel a pivotable, rotatable front directional wheel using their arms or legs for propulsion and manually turn the directional wheel in either of a clockwise or counter-clockwise direction.

A transmission system and a steering system for a directional wheel of a vehicle has therefore been provided. The steering system integrates two assemblies, namely: a rotary to variable linear converter assembly (hereinafter referred to as "the converter assembly"), and a manually operated control assembly. The converter assembly functions to convert rotational drive provided by a rotating cylinder into a variable linear output of lateral force, which is used to apply torque to the directional wheel to turn it as needed for steering. The control assembly functions to translate digitally actuated steering movements provided by the user into steering control for the converter assembly in a form which is indicative of the digit movements. The transmission system integrates two assemblies, namely: power transfer assembly and a side flex chain assembly. The power transfer assembly functions to convert input power from the user into torsional force to drive rotation of a crank shaft. In some embodiments the power transfer assembly is a crank assembly that functions to guide the hands of a user into circular motion in the users' sagittal plane by remaining in the vertical longitudinal plane of the vehicle when in use and convert the forces provided by the user into rotational power. The side flex chain assembly transfers the rotational power of the power transfer assembly to the directional wheel while it is pivoting left or right thus propelling the vehicle during the course of steering.

In one exemplary detailed embodiment, the power transmission system comprises:
  a power transfer assembly;
  a side flex chain assembly comprising
    a crank shaft functionally connected to the power transfer assembly wherein when the power transfer assembly is engaged torque is transferred to the crank shaft;
    a crank sprocket rigidly connected to the crank shaft;
    a side flex chain sprocket rigidly connected to a rod; and a side flex chain that engages the crank sprocket and the side flex chain sprocket; and at least one direction wheel functionally connected to the side flex chain assembly;

wherein, torque resulting from movement of the at least one handle is transmitted through at least the side flex chain to the at least one directional wheel and propels the vehicle and wherein when the at least one directional wheel moves from the straight-ahead direction the side flex chain twists without disengaging from the crank sprocket or the side flex chain sprocket.

The power transmission system can comprise a crank assembly or a rowing assembly. When the power transmission system is a crank assembly, it can comprise at least one handle and at least one crank arm. When the power transmission system is driven by one or both arms of a user, the at least one handle rotates in a circular motion substantially within the sagittal plane of the user and the vertical longitudinal plane of the vehicle even when the vehicle is turning left or right.

The side flex chain assembly includes the various rods, sprockets, and chains, including at least one side flex chain, that allows transfer of the force from the power transmission system into a torsional force that drives at least one directional wheel. In some embodiments the side flex chain assembly can include rods, sprockets and one side flex chain that connects directly with the power transmission system on one end and at least one directional wheel on the other end. In other embodiments the side flex chain assembly can include additional rods, sprockets and chains between the side flex chain and the power transmission system and/or between the side flex chain and at least one direction wheel.

In broad concept, a steering system for a directional wheel is provided wherein a rotatable, pivotable friction wheel, constrained and guided so as to be positioned normal to the cylinder outer surface it runs on, is combined with manually operated means adapted to vary or turn the friction wheel around its pivot axis and thereby produce lateral movement thereof. This lateral movement is controlled and used to provide steering of the directional wheel. A system is therefore provided in which small manual movements of user-accessible buttons, requiring minimal input force for operation, can control and vary the direction, extent and rate of movement of the friction wheel and consequential turning of the directional wheel across a relatively wide range of movement. In addition, power provided by the forward movement of the vehicle is used to rotationally drive the system.

A continuum of button movements is utilized to provide dynamic control of steering. Interlaced into this continuum, a neutral position may be used involving neither left or right buttons activated, to provide intervals of static control wherein steering occurs in a straight ahead direction or along a constant curve.

The specific embodiment described is characterized by the following features:

The button movement controls the direction of turning of the friction wheel;

the duration of button activation controls the extent of turning of the friction wheel; and the speed of the vehicle modifies the rate and acceleration of turning of the directional wheel.

In one aspect of the invention, a system is provided for steering a rotatable and pivotable directional wheel of a vehicle that can be driven by a power transfer assembly, comprising:

a rotary to variable linear converter assembly comprising a rotatable cylinder, having a rotative outer surface, and a rotatable pivotable friction wheel positioned in contact with said outer surface so that they rotate together as a coupled assembly;

said converter assembly further comprising guide means extending lengthwise of the cylinder in constant spaced arrangement and a slide assembly slidable along the guide means, said slide assembly having a rotatable stem connected with the friction wheel for pivotably varying said friction wheel's orientation;

said slide assembly and friction wheel thereby forming a laterally slidable unit which is connected with the directional wheel for steering it;

means for connecting said coupled assembly with a source of rotational drive associated with the vehicle; and manually controlled means for actuating rotation of the stem to vary the friction wheel orientation for the purpose of steering.

In another aspect, a method for steering a rotatable and pivotable directional wheel of a vehicle is provided, comprising:

generating a lateral turning force using a rotary to variable linear converter assembly comprising a rotating cylinder having an outer surface and a laterally movable, constrained, pivotable and rotatable friction wheel in contact with said outer surface and adapted to reciprocate thereon;

manually controlling and varying the angularity of the friction wheel relative to the direction of movement of the cylinder outer surface to turn or hold steady the friction wheel so that it advances along the rotating cylinder or remains stationary and thereby produces the turning force; and applying the turning force generated to turning the directional wheel.

In one preferred embodiment, the transmission system comprises:

a support frame rigidly mounted to a wheelchair, to support a shaft which has an axis, the axis being held in a position parallel to the intersecting axes of the coronal and transverse planes of the user, left and right crank arms and handles, connected to the shaft, to allow the hands of a user to rotate the shaft, whereby the hands rotate in a circular pattern substantially in the vertical longitudinal plane and the tangential force from the muscles provide torque on the shaft, a sprocket connected to the shaft which engages a side flex chain, a side flex chain having convex bores on the bushings, and clearance between the plates, a support frame connected to the forks of a vehicle to support a shaft, which has an axis, the axis being held in a position parallel to the axis of the directional wheel, two sprockets, coupled together, which rotate freely on a shaft, one of the sprockets engaged with the side flex chain, and the second engaged with a chain, a sprocket mounted on the hub of the directional wheel, which engages with the chain.

whereby torque provided by the user is transmitted, through a series of chains and sprockets including at least one side flex chain, to the hub of the directional wheel and propels the vehicle forward, and, the pivoting motion of the directional wheel causes the side flex chain to twist without disengaging from its sprockets.

DESCRIPTION OF THE DRAWINGS

FIG. 7A is a front view illustration of one embodiment of the transmission system while traveling the vehicle is turning left (left hand illustration), moving in a straight forward direction (middle illustration) and turning right (right hand illustration), showing a twisting side flex chain;

FIG. 18 is a top sectional elevation illustrating the angular position of the friction wheel (the arrows indicate lateral force (F) and steering torque (T)) and the manual control while the vehicle continues to turn left (arrow indicates the user manually activating the button);

FIG. 19 is a top sectional elevation illustrating the angular position of the friction wheel (the arrows indicate lateral force (F) and steering torque (T)) and the manual control while the vehicle is proceeding at a constant left turn;

FIG. 20 is a top sectional elevation illustrating the angular position of the friction wheel (the arrows indicate lateral force (F) and steering torque (T)) and the manual control while the vehicle is turning to the right (arrow indicates the user manually activating the button);

FIG. 21 is a top sectional elevation illustrating the angular position of the friction wheel (the arrows indicate lateral force (F) and steering torque (T)) and the manual control while the vehicle continues to turn right (arrow indicates the user manually activating the button);

DESCRIPTION OF THE PREFERRED EMBODIMENT

In General

In the following description, certain specific details are set forth in order to provide a thorough understanding of various aspects of the disclosed subject matter. However, the disclosed subject matter may be practiced without these specific details.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment", "an embodiment" or "in some embodiments" means a particular feature, structure, or characteristic described in connection with the embodiment is included in at least one embodiment. Thus, the appearance of the phrases "in one embodiment", "in an embodiment" or "in some embodiments" in various places throughout the specification are not necessarily all referring to the same aspect. Furthermore, particular features, structures, or characteristics may be combined in any suitable manner in one or more aspects of the present disclosure.

For the purpose of the present description and of the appended claims, except where otherwise indicated, all numbers expressing amounts, quantities, time frames, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the appended claims, the words "a" or "an" should be read to include one or at least one and the singular also includes the plural unless it is obvious that it is meant otherwise. This is done merely for convenience and to give a general sense of the invention.

Figure 24:
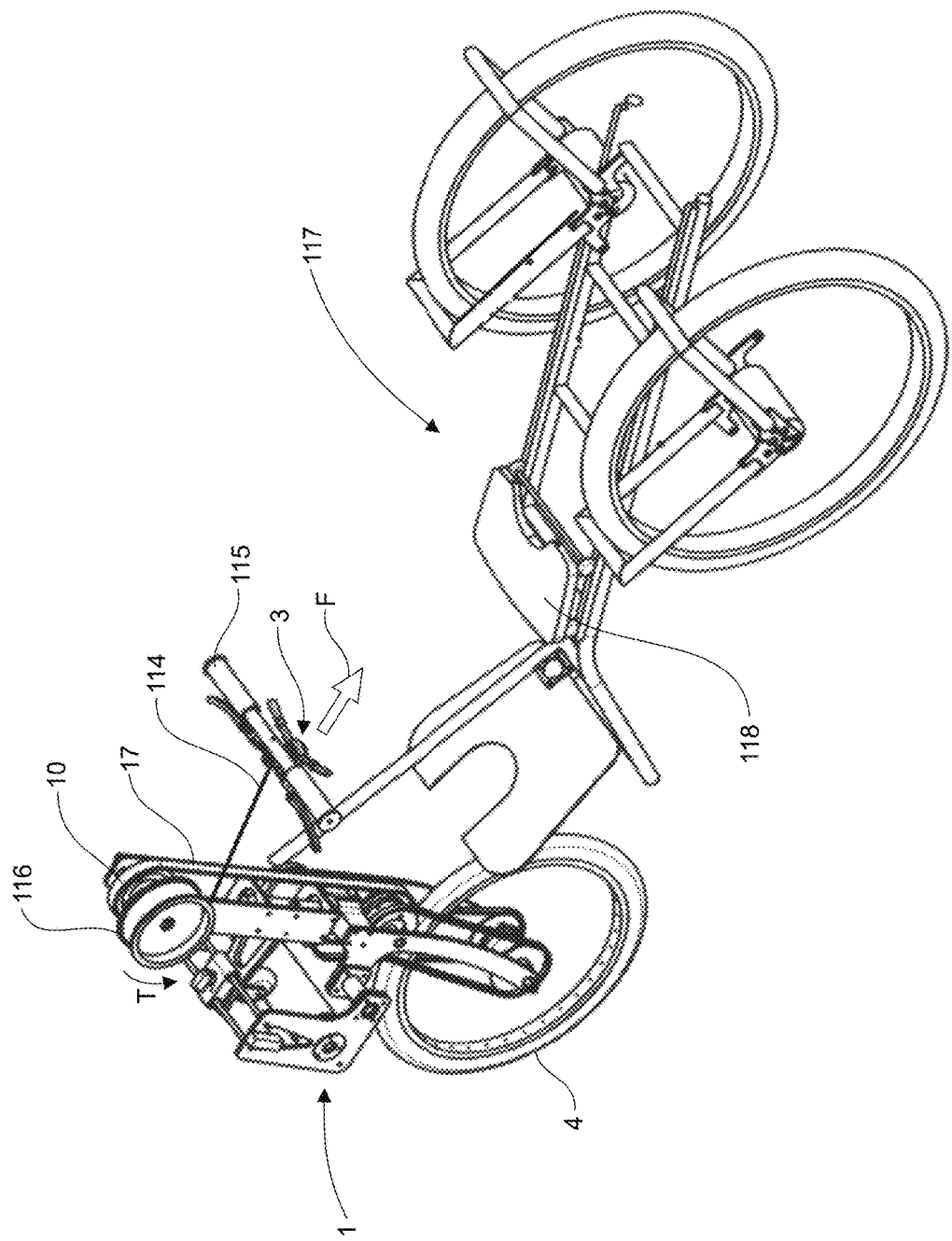
FIG. 24 is an alternate embodiment of a manually powered vehicle where the vehicle is powered by a rowing mechanism rather than a crank mechanism.
Figure 25:
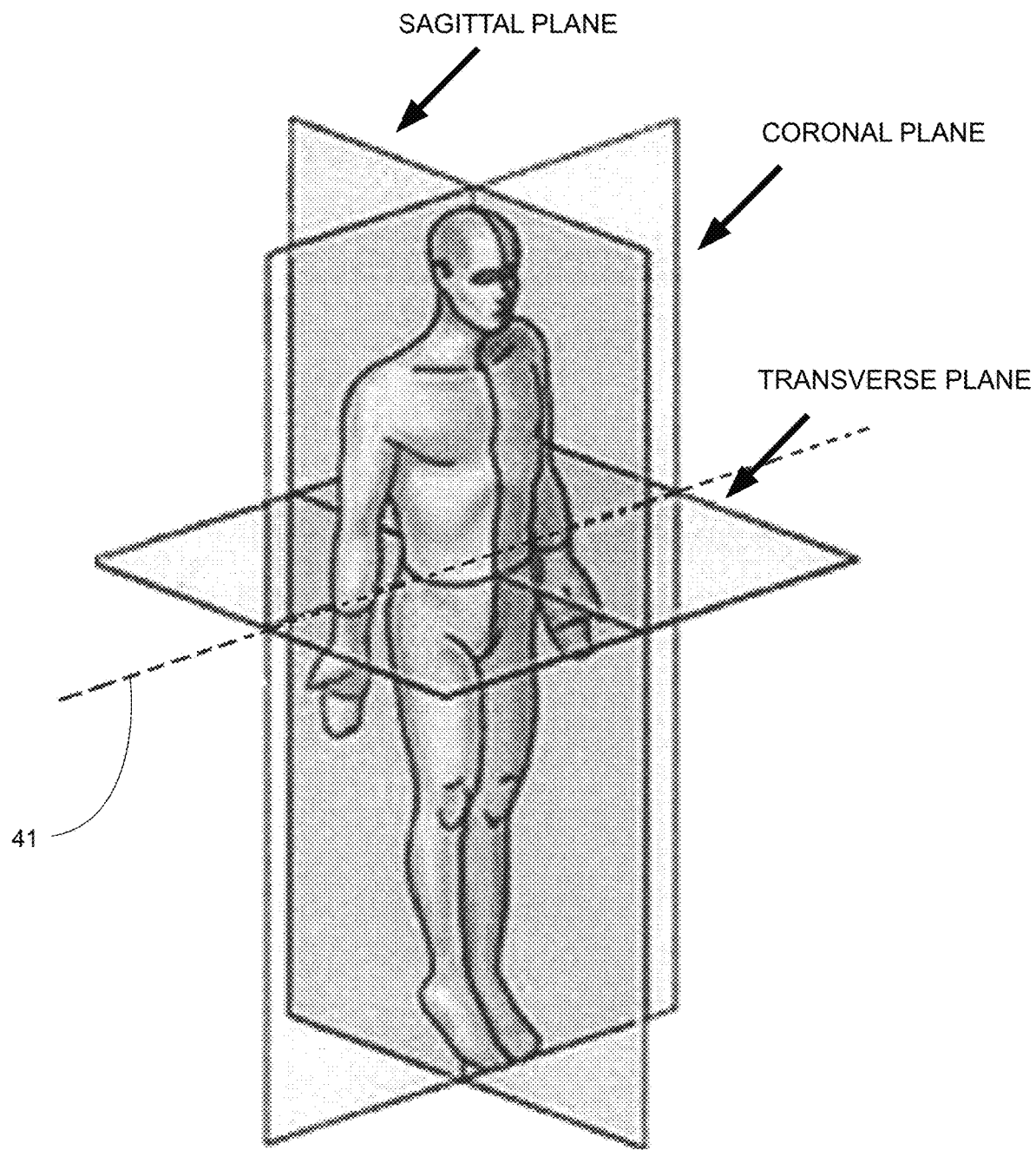
FIG. 25 is a perspective view of a user showing the anatomical planes.

The manually powered vehicle 5 provided here comprises a transmission system 7 and a steering system 1. The transmission system 7 comprises components that covert manual power that is inputted into the crank shaft 71 as torque by a power transfer assembly, to at least one directional wheel 4 via a side flex chain 17 to propel the vehicle 5. In some embodiments, the manually powered transfer assembly is a crank assembly 9, whereas in other embodiments the manually powered transfer assembly is a rowing assembly, as shown in FIG. 24. In each embodiment a crank shaft 71 functionally connected to the power transfer assembly so that when the power transfer assembly is engaged, either through the crank assembly 9 or the rowing assembly, torque is transferred to the crank shaft 71. In one embodiment a user 6 can sit on a seat of a vehicle 5 which can be mounted to the transmission system 7 by frame 56. The user 6 is able to change the direction of the vehicle 5 through the steering system 1, which can also be functionally attached to the vehicle 5. The steering system 1 functions to turn the at least one directional wheel 4 so that the vehicle 5 can turn left and right.

Figure 26:
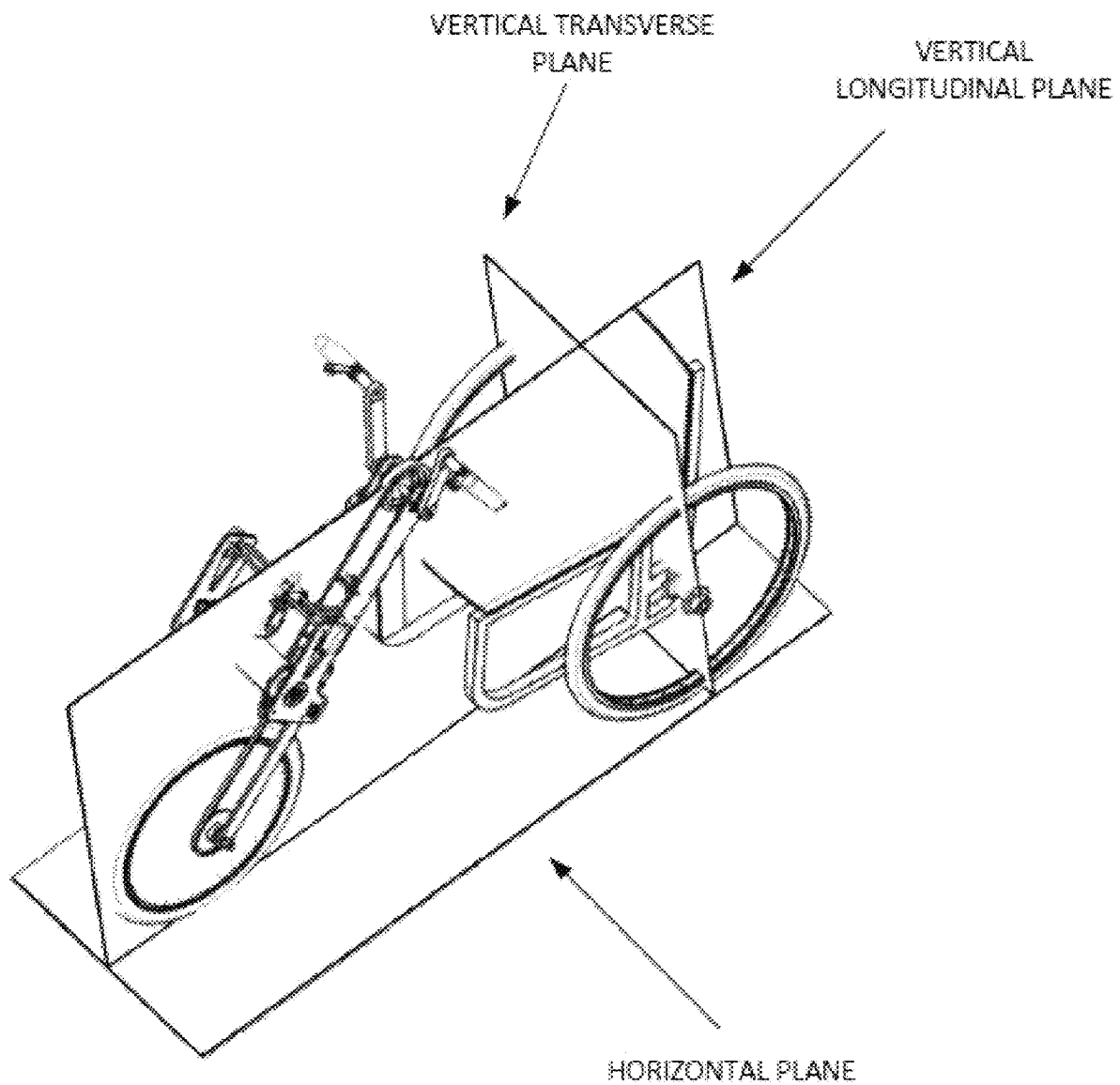
FIG. 26 is a perspective view of an embodiment of the vehicle showing the various inherent planes of the vehicle.

Any suitable steering system may be functionally attached to the vehicle 5 to turn the at least one directional wheel 4. A suitable steering system is one that allows for the user to alter the relative orientation of the at least one directional wheel 4 while keeping the crank assembly 9 generally aligned within the sagittal plane of the user and substantially parallel with the vertical longitudinal plane of the vehicle 5 (as shown in FIG. 26). In one embodiment, the steering system 1 can comprises a rotary to linear converter assembly 2 working in conjunction with a manually-operated control assembly 3. They can cooperate to steer the at least one front directional wheel 4 of a manually powered vehicle 5 in response to short manual manipulation, for example short thumb movements, applied by the user 6 to left button 61 and/or right button 63. In some embodiments the steering system 1 can turn the at least one directional wheel 4 in time response to small button movements in a relatively broad manner, thereby providing variable amplification.

It is contemplated that in some embodiments there may be more than one front directional wheel. It is also contemplated that in some embodiments the vehicle could be a tricycle, a modified wheelchair, a recumbent bike, or any other manually powered vehicle where the front wheel is used to both drive and steer the vehicle.

The Transmission System

Figure 2:
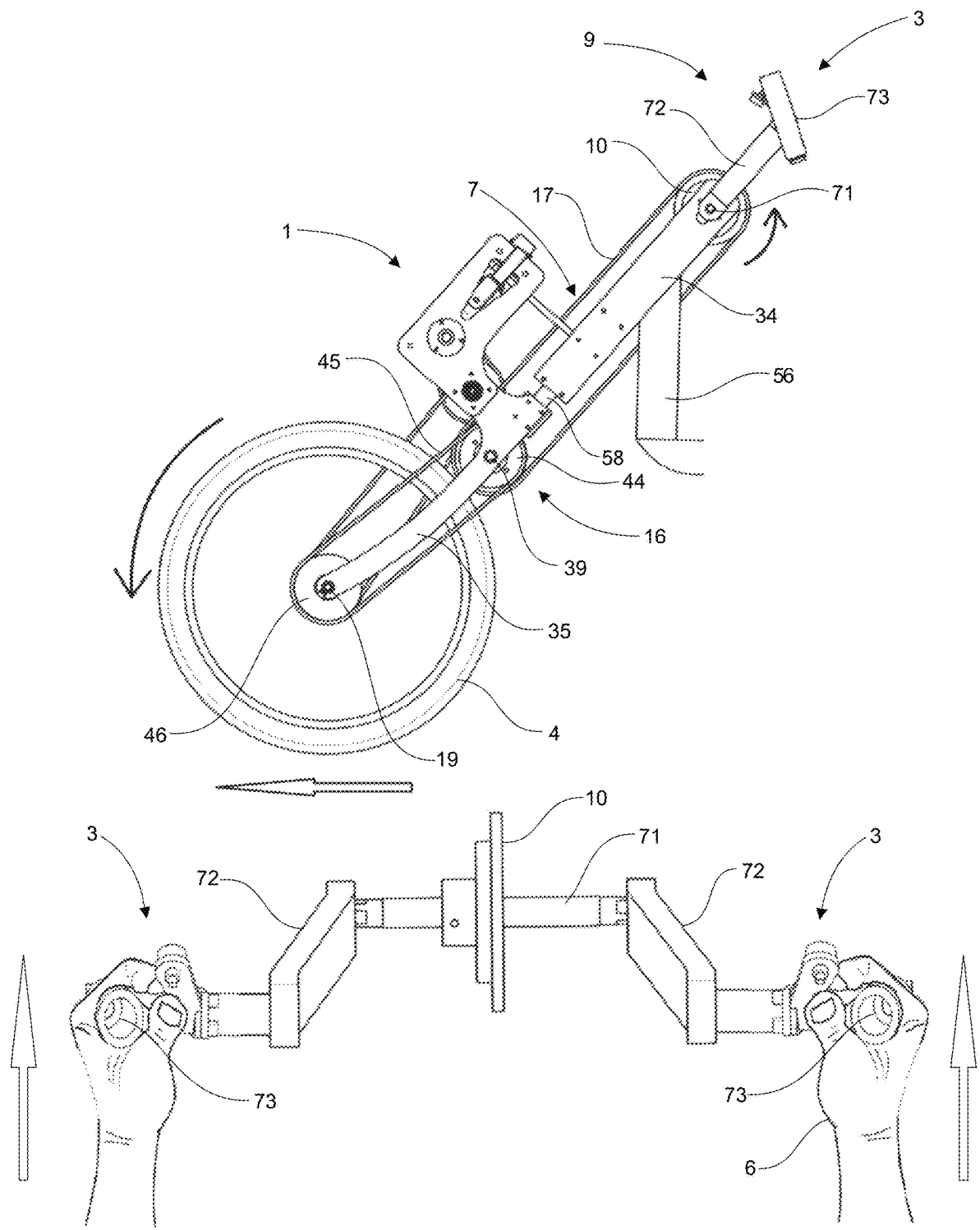
FIG. 2 is a side view illustration of one embodiment of the transmission system and the steering system showing the rotation of the crank assembly and directional wheel and a top view illustration of the crank assembly showing tangential forces and a control system.
Figure 3:
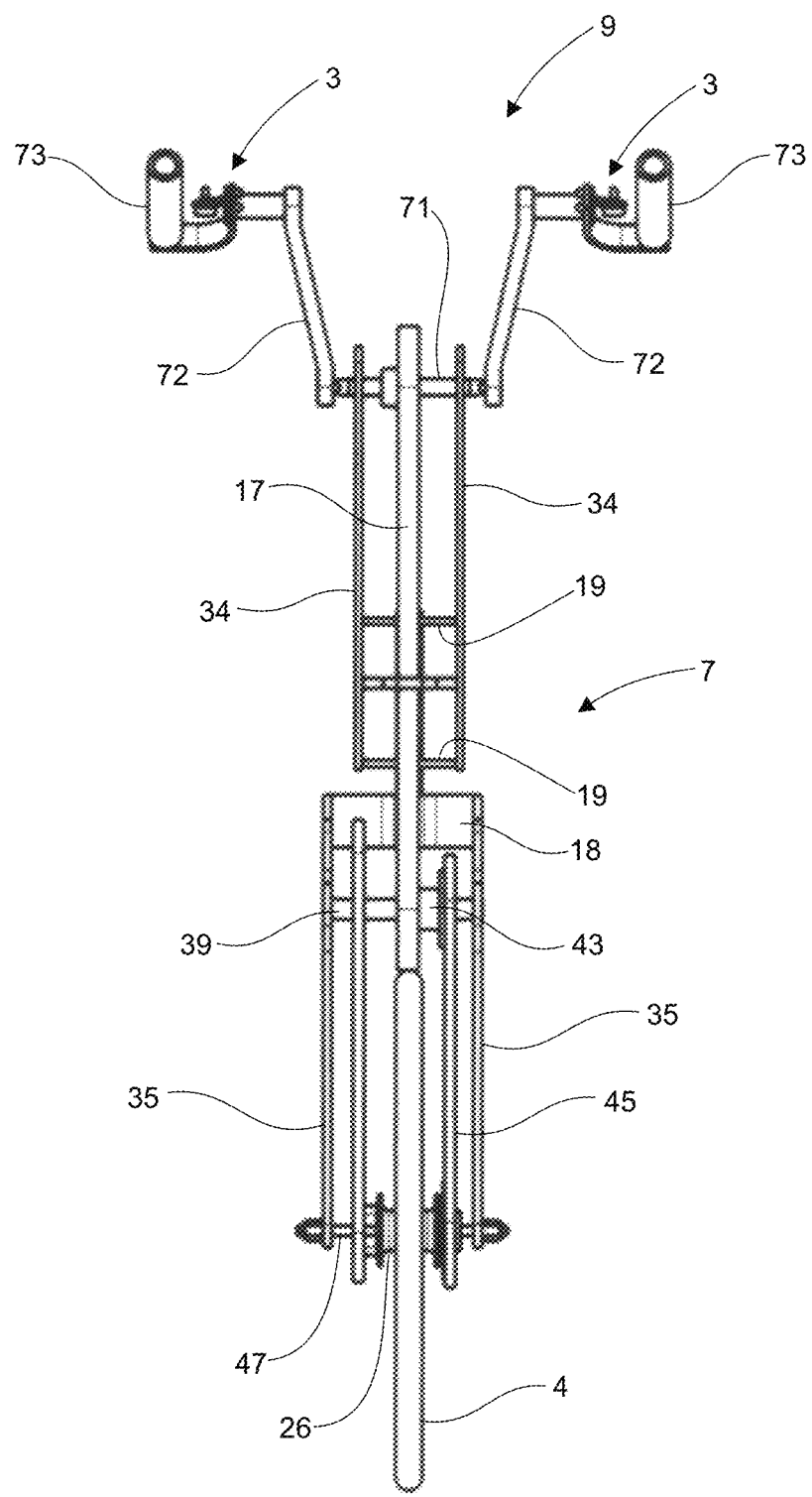
FIG. 3 is a front view of one embodiment of the transmission system.
Figure 4:
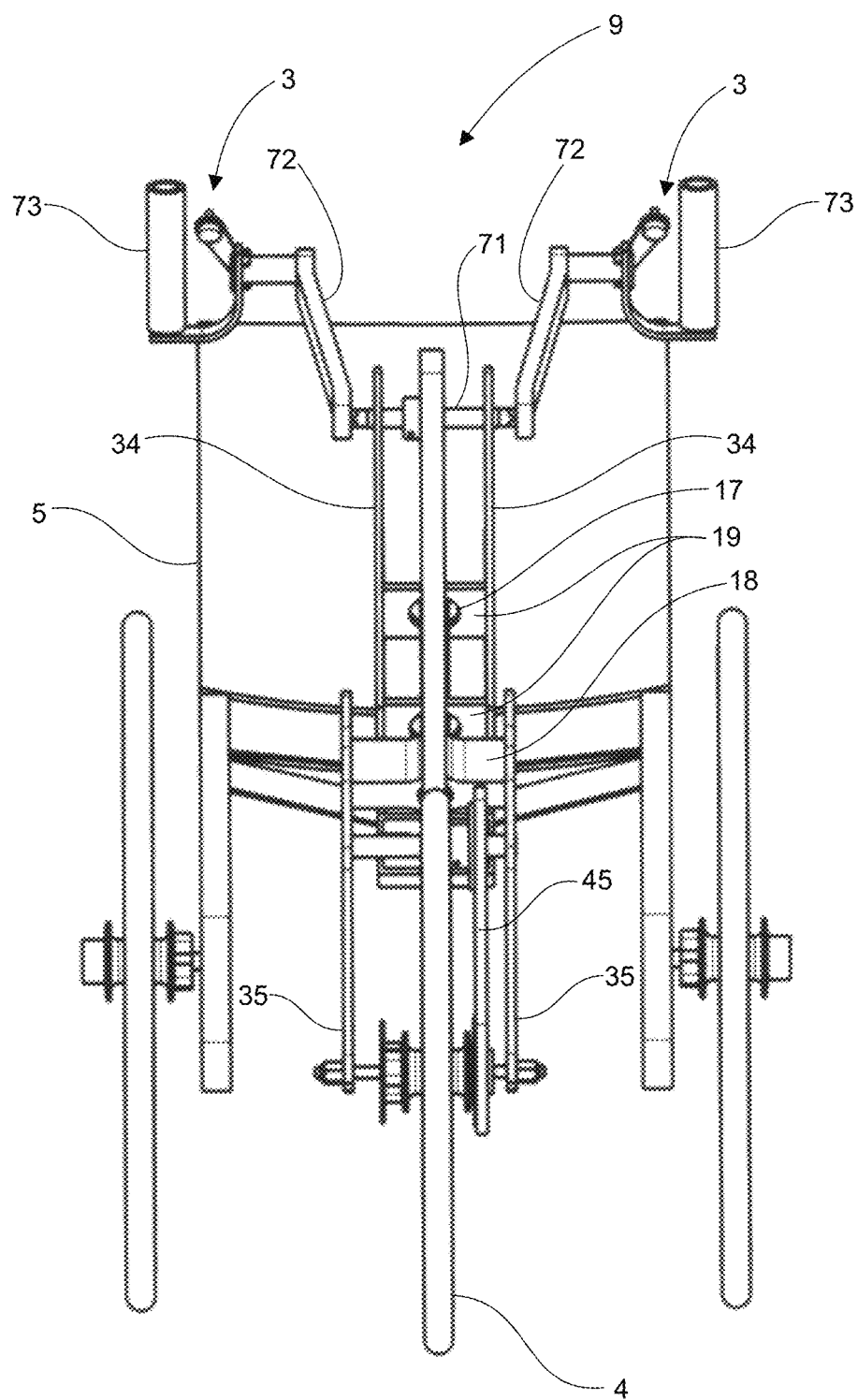
FIG. 4 is a front view illustration of one embodiment of the transmission system mounted to a vehicle while steering straight forward.
Figure 5:
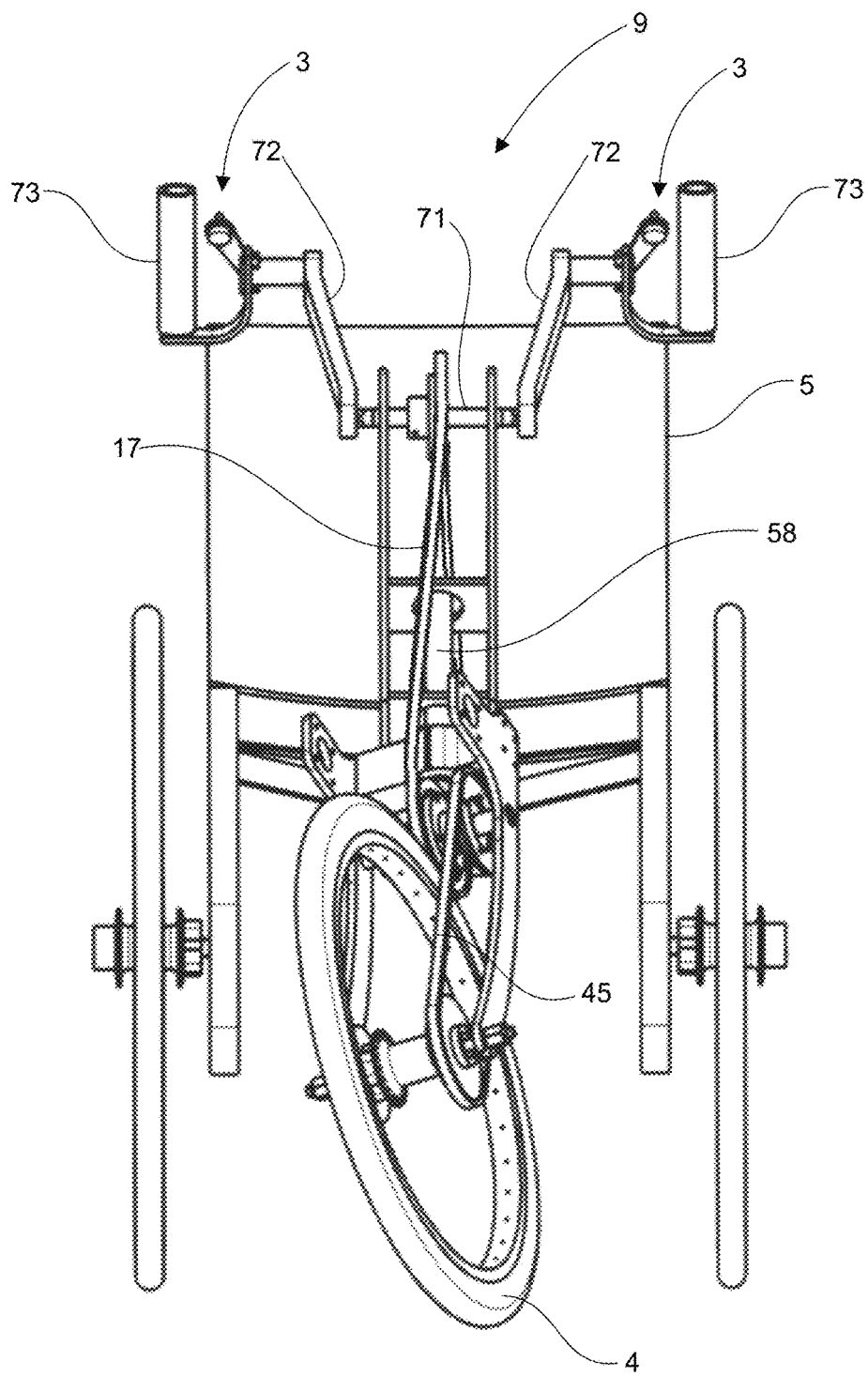
FIG. 5 is a front view illustration of one embodiment of the transmission system mounted to a vehicle while turning right.
Figure 6:
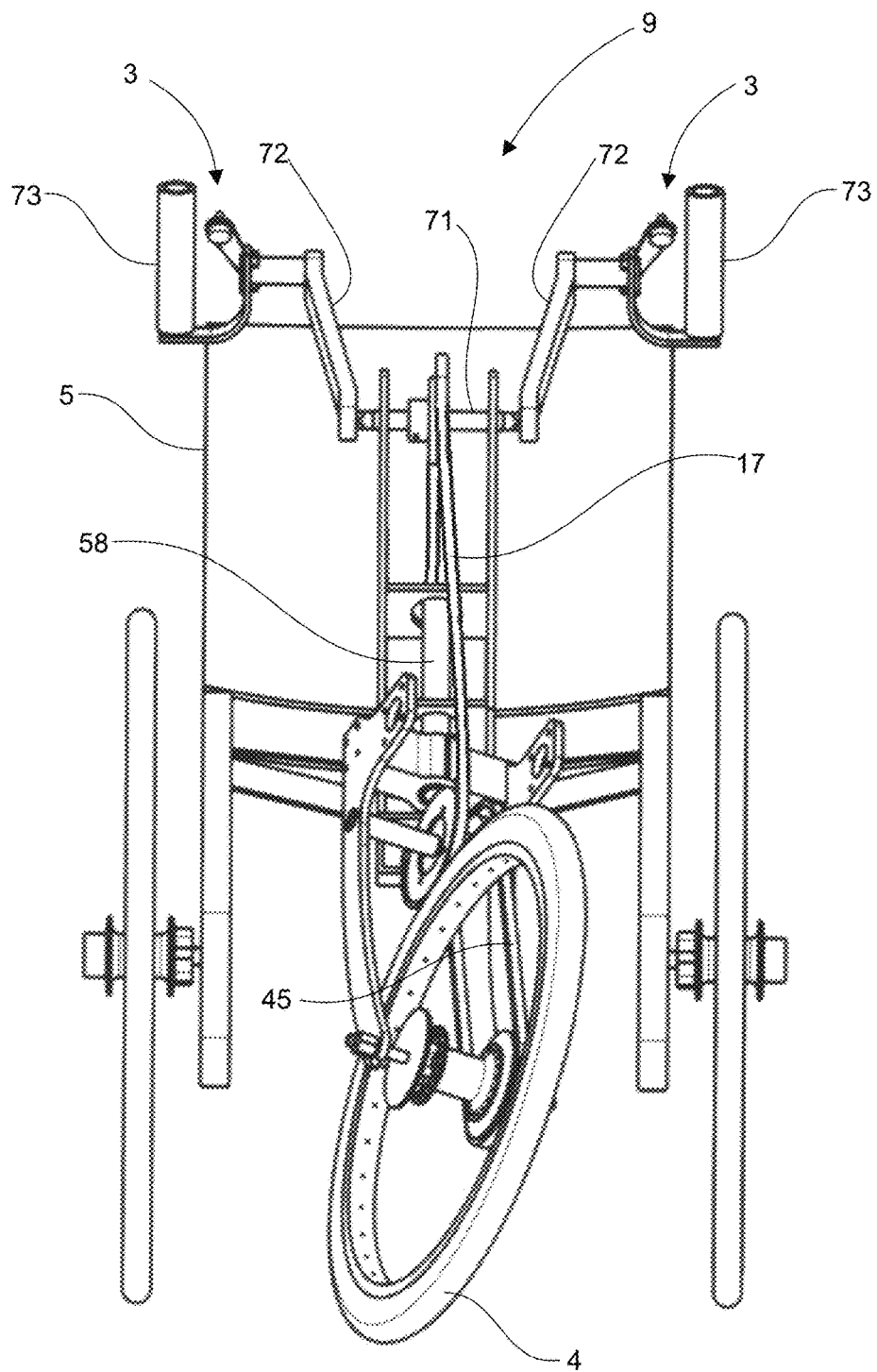
FIG. 6 is a front view illustration of one embodiment of the transmission system mounted to a vehicle while turning left.

The transmission system comprises a power transfer assembly and a side flex chain assembly. Referring to FIGS. 2, 3, and 7, in some embodiments the power transfer assembly comprises a crank assembly 9. The crank assembly 9 comprises at least one handle 73 and at least one crank arm 72. The at least one handle 73 are each rotationally connected to a crank arm 72. While the figures show two handles 73 and two corresponding crank arms 72, it is contemplated that in some embodiments one handle 73 and one crank arm 72 may be used and that in other embodiments more than two handles 73 and corresponding crank arms 72 may be used. Crank arms 72 are preferably rigidly, connected to crank shaft 71. Crank sprocket 10 is rigidly mounted on crank shaft 71. The crank assembly 9 functions to transfer the force generated by a user 6 on at least one handle 73 to a side flex chain 17 which is engaged with crank sprocket 10. More specifically, the tangential component of the force on at least one handle 73, as shown in FIG. 2, produce torque on crank shaft 71 and crank sprocket 10. As a result of the side flex chain 17 being engaged with crank sprocket 10 the torque on crank sprocket 10 translates to force on side flex chain 17, causing it to move around the crank sprocket 10.

In the Figures the at least one handle 73 are shown as being manually powered through a users hands, however it is contemplated that the at least one handle 73 could be manually powered in other ways, for example, feet or foot powered, one hand powered, a combination of feet or foot and one or two hand powered. Therefore, while the term "handle" is used herein rather than the term "pedal", it is contemplated that the handle 73 could be a traditional pedal used in leg powered vehicles and the term handle 73 should be understood as referring to a handle and/or a pedal depending on what part of the body is providing the manual power. Additionally, in the Figures the at least one handle 73 are shown to be in alignment with each other. In some embodiments the at least one handle 73 may be positions about 180 degrees offset from each other.

In some embodiments the vehicle 5 may not have any handles 73 or crank arms 72. For example, as shown in FIG. 24, a vehicle 5 a rowing assembly is used at the power transfer assembly. In this embodiment, a user 6 sits on a sliding seat 118, which reciprocates on slides mounted on tricycle 117, and pulls on handlebar 115 thereby transferring the force from muscles to cord 114, which, in turn, creates torque on drum 116. Drum 116 can be functionally coupled to the crank shaft 72 upon which crank sprocket 10 is rigidly mounted. As in other embodiments, crank sprocket 10 engages side flex chain 17 and therefore transmits the force from the rowing assembly to side flex chain 17.

Figure 23:
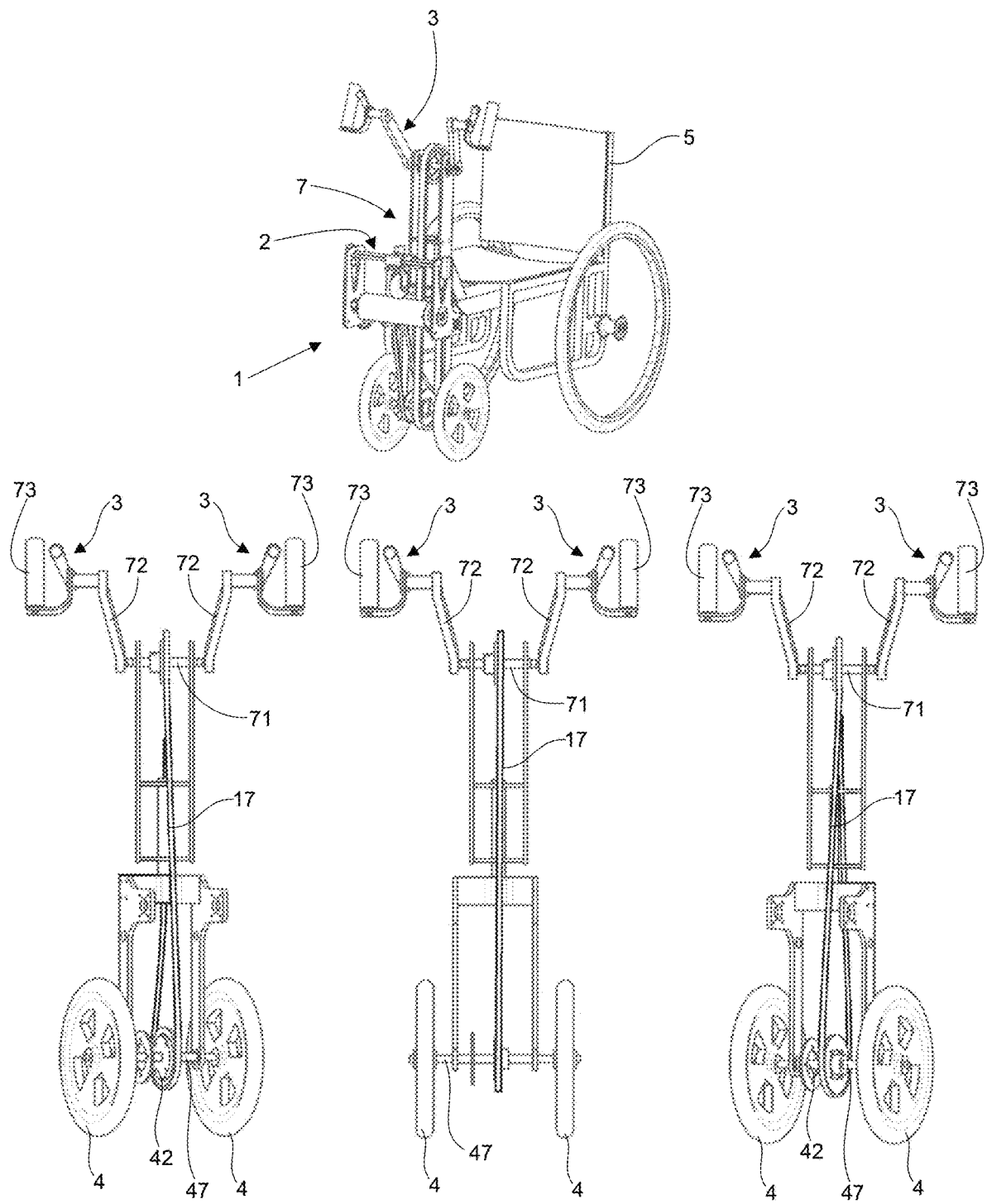
FIG. 23 is an alternate embodiment showing the side flex sprocket mounted on the same axle as the directional wheels.

The side flex chain 17 is also engaged with side flex chain sprocket 42 which in some embodiments is mounted on carrier shaft 39. In other embodiments, for example as shown in FIG. 23, the side flex chain sprocket 42 can be mounted on axle 47. It is contemplated that any other number or sequence of chains and sprockets may be used as long as a side flex chain is used in the transmission of torque from the initial manual input from the user 6 to the at least one direction wheel 4. The side flex chain assembly of the transmission system 7 comprises at least the crank shaft 71, crank sprocket 10, side flex chain 17, side flex chain sprocket 42 and rod.

When the side flex chain sprocket 42 is mounted on carrier shaft 39, first hub chain sprocket 44 can also be mounted on the carrier shaft 39. Therefore, when side flex chain 17 drives the rotation of the carrier shaft 39, first hub chain sprocket 44 also rotates. In some embodiments, a hub chain 45 can be used and can engage both first hub chain sprocket 44 and second hub chain sprocket 46. Second hub sprocket 46 can be mounted on hub 26, thereby passing the rotational force from the carrier shaft 39 to hub 26.

In some embodiments hub 26 and at least one directional wheel 4 can be rotationally mounted to axle 47 and rotate around axle 47 as one assembly. Therefore, the force applied to the at least one handle 73 by the user 6 travels via the side flex chain 17, and in some embodiments through the hub chain 45, to drive the directional wheel 4. Side flex chain 17 is able to twist along its length without disengaging from either crank sprocket 10 or side flex chain sprocket 42. In some embodiments the crank assembly 9 can be functionally connected to the at least one directional wheel 4 in any manner, provided that a side flex chain 17 is utilized in the transmission system 7. For example, as shown in FIG. 23, the side flex chain 17 can connect to a crank sprocket 10 mounted on crank shaft 71 and to a side flex chain sprocket 42 mounted on axle 47. In this embodiment, there are two directional wheels 4, also mounted on axle 47 and no hub chain 45 is needed to transmit torque from the crank assembly 9 to the at least one direction wheel 4. Reference herein to a "rod" includes a carrier shaft 39, axle 47 or any other shaft or axle to which the crank sprocket 10 or side flex chain sprocket 42 may be rigidly connected to in order to transmit the torque from the crank shaft 71 through the side flex chain 17 to the at least one directional wheel 4.

The frame sides 34, crank shaft 71, crank arms 72 and at least one handle 73 can be arranged in any way as long as they allow the rotation of the at least one handle 73 to be substantially in the sagittal plane of the user and substantially in the vertical longitudinal plane of the vehicle 5 when the user 6 is manually powering the vehicle 5. In some embodiments, generally parallel frame sides 34 can be mounted rigidly to the vehicle 5 and provide support for the transmission system 7. Crank shaft 71 can be rotationally and substantially perpendicularly mounted to the frame sides 34. In some embodiments the axis of crank shaft 71 is generally aligned with the axis of intersection of the coronal and transverse planes of the human anatomy 41.

The frame sides 34 can function to support the steering system 1. In some embodiments parallel brackets 19 are rigidly and substantially perpendicularly mounted between frame sides 34. Steering column 58 is rotationally mounted to parallel brackets 19. Crown 18 is centrally and rigidly mounted on steering column 58. Forks 35 are rigidly mounted to crown 18. Axle 47 is rigidly mounted substantially perpendicular and between forks 35.

In some embodiments, carrier shaft 39 can be rotationally mounted substantially perpendicular, between forks 35 and substantially parallel to axle 47. Carrier 43 is rigidly connected to carrier shaft 39. When side flex chain sprocket 42 and first hub chain sprocket 44 are both used they are rigidly mounted to carrier 43 and rotate as one unit. Side flex chain 17 engages side flex chain sprocket 42 and provides force on side flex chain sprocket 42 and torque on carrier 43. Hub chain 45 engages first hub chain sprocket 44 and the torque on carrier 43 provides force on hub chain 45.

When in motion, the components of the transmission system 7 work together to power the at least one directional wheel 4 to in order to propel the vehicle 5 forward, as well as allow the at least one directional wheel 4 to turn left and right while maintaining the at least one handle 73 substantially in the vertical longitudinal plane. It is anticipated that while one example of a specific arrangement of elements is provided herein, that a skilled person would understand that other arrangements of elements are possible, provided that the at least one handle 73 remain substantially in the sagittal plane and that a side flex chain is used to allow for proper steering without disengagement of the chain during turning. As referred to herein, substantially in the sagittal plane and substantially in the vertical longitudinal plane includes a deviation from the sagittal plane by no more than about 35 degrees left or right. As the angle from the sagittal plane and vertical longitudinal plane increases, there are additional tangential forces that the user must navigate.

Figure 7B:
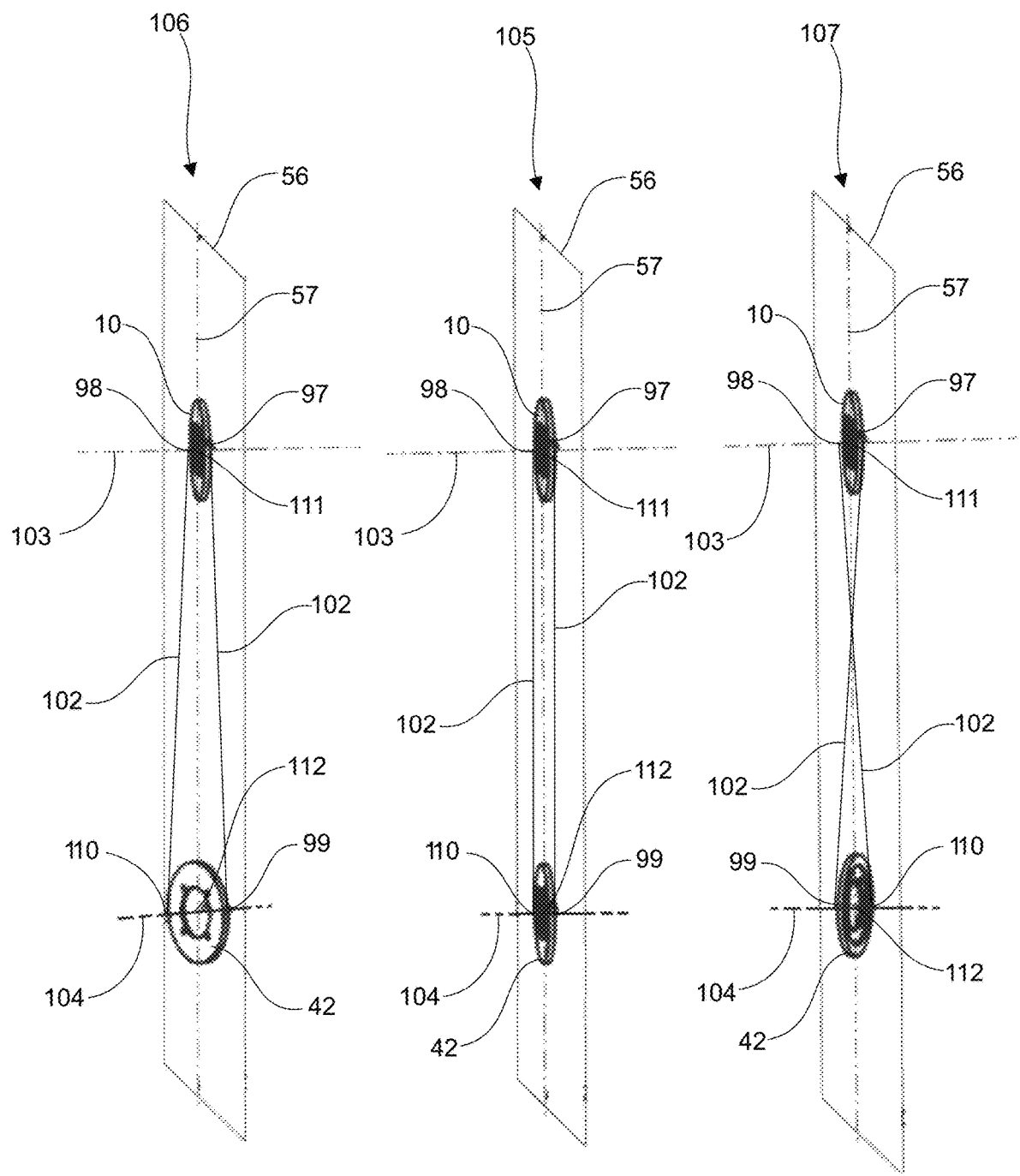
FIG. 7B is a projection illustration of part of the transmission system showing the path of the side flex chain while the vehicle is turning left (left hand illustration), moving in a straight forward direction (middle illustration) and turning right (right hand illustration)
Figure 7C:
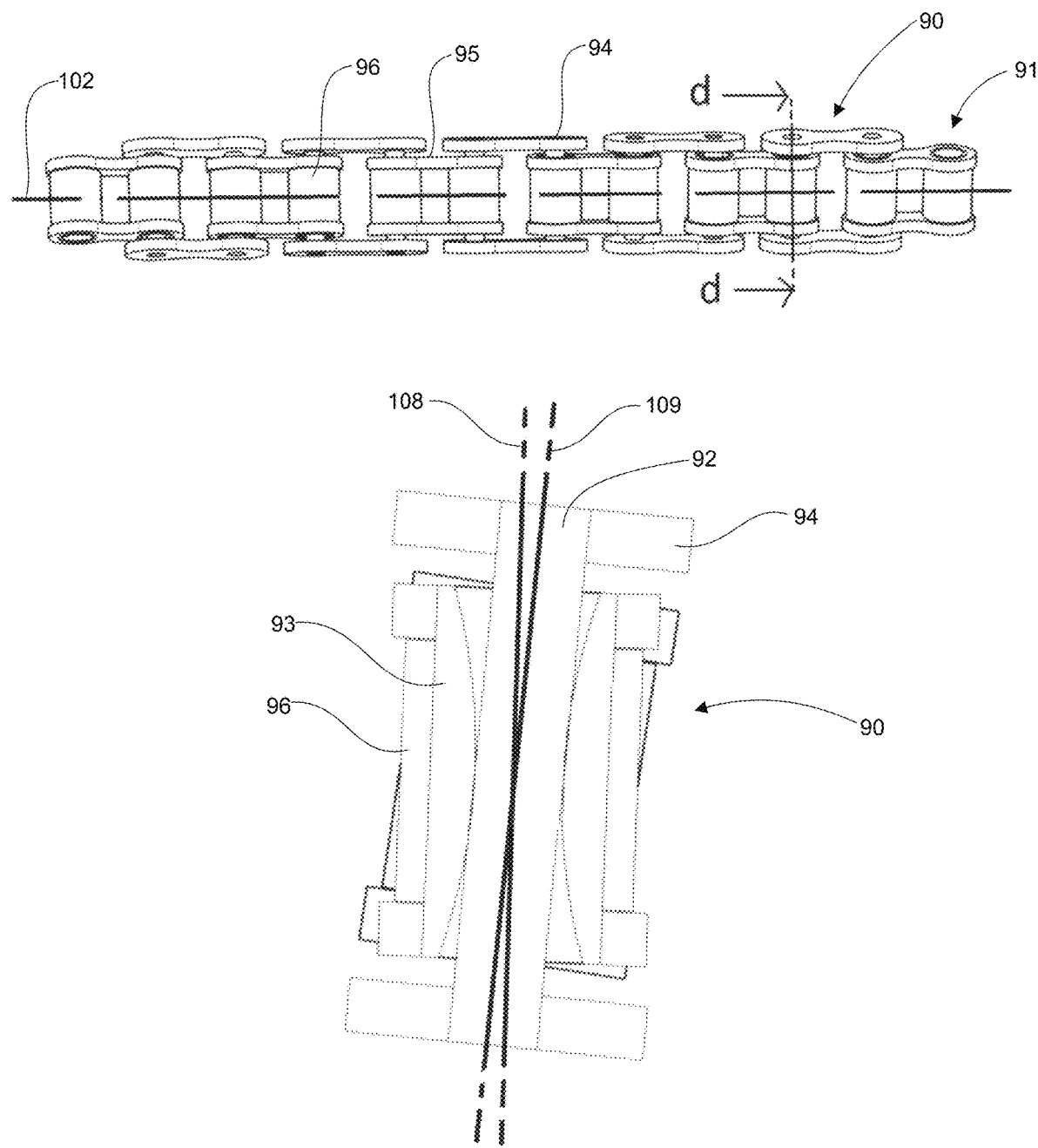
FIG. 7C shows a side flex chain and a cross section illustration of the side flex chain along the line d-d showing the bushings with convex shaped bores.
Figure 8:
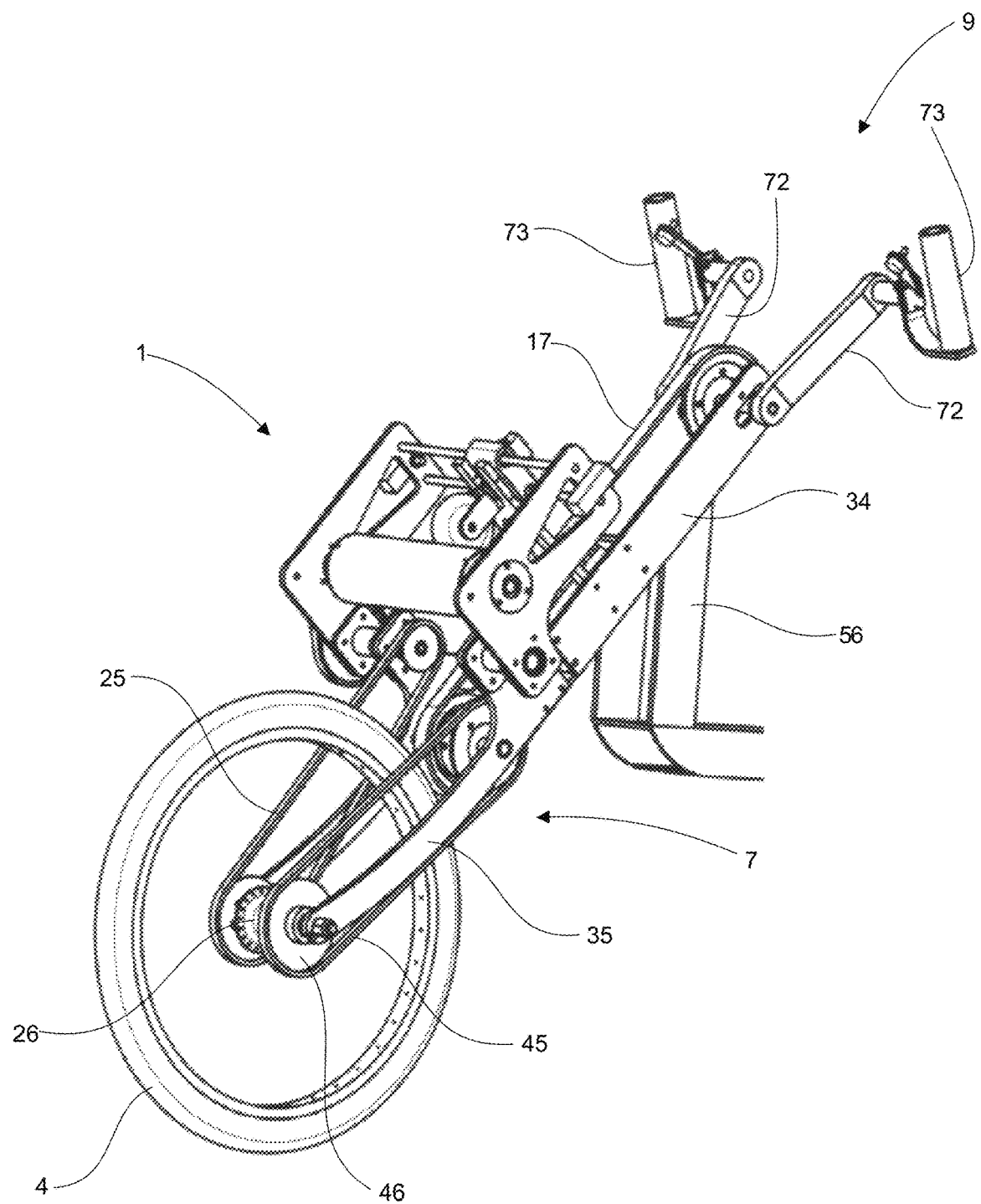
FIG. 8 is a perspective illustration of a transmission system and steering system showing a converter assembly, manually operated control assembly, arm powered crank assembly and side flex chain.

Side flex chain 17, best seen in FIG. 7C, is constructed with a series of outer links 90 and inner links 91 held together with pins 92, bushings 93, outer side plates 94 and inner side plates 95. Outer side plates 94 are rigidly attached to pins 92. Inner side plates 95 are rigidly attached to bushings 93. Pins 92 are rotationally attached to bushings 93. Rollers 96 are rotationally mounted to bushings 93. Pins 92 rotate around first axis 109 and bushings 93 rotate around second axis 108. As a result of the convex inner face of bushing 93, each discrete chain element of side flex chain 17 can independently pivot between a first axis 109 and a second axis 108. This twisting ability of the side flex chain 17 contributes to the ability of the side flex chain 17 to remain engaged with the both the crank sprocket 10 and the side flex chain sprocket 42 when the at least one front directional wheel 4 angles away from the straight-ahead direction.

Rollers 96 intimately engage crank sprocket 10 and side flex chain sprocket 42 and aligns the axis 108 of bushings 93 with the axis of crank shaft 71 and carrier shaft 39 or axle 47, depending on whether additional chains are used. During left or right turning of at least one directional wheel 4 the crank shaft 71 and carrier shaft 39 or axle 47 are not parallel therefore the axis 108 of bushings 93 engaged with crank sprocket 10 are not parallel with the axis 108 of bushings 93 that are engaged with side flex chain sprocket 42. This misalignment of the axis 108 of bushings 93 causes side flex chain 17 to twist along path 102. The bore of bushings 93 are convex in nature and allow pins 92 to rotate freely within bushings 93 when the axis of pins 92 are not parallel with the axis of bushings 93. Spacing between inner side plates 95 and outer side plates 94 provide clearance.

Side flex chain 17 engages crank sprocket 10 and side flex chain sprocket 42 and follows a path 102 indicated by points 97 to 99 and 98 to 110, seen in FIG. 7B. During straight ahead riding 105, path 102 is equal to the distance between axis 103 and 104 and increases as at least one directional wheel 4 turns left 107 or right 106. At least one directional wheel 4 steers the vehicle left or right around first axis 57. First axis 57 is centrally located in steering column 58. Preferably, axis 103 and 104 intersect substantially perpendicular to first axis 57, thus minimizing the change in length of path 102 and producing an substantially equal change in the length of path 102 between points 97-99 and points 98-110 during steering. In this instance first axis 57 being substantially perpendicular to axis 103 and/or 104 means that axis 103 and/or 104 can be any degree above or below 90 degrees that results in a minimal amount of change in length of path 102 between points 97-99 versus points 98-110 during steering such that the side flex chain 17 remains engaged with the cranks sprocket 10 and the side flex chain sprocket 42 during steering.

In some embodiments a chain tensioner and/or a chain guide (not shown) can be used according to common industry. Other common chain modification tools or devices, such as alignment devices, may be used to improve overall action of the chains in the transmission system 7.

The Steering System

The steering system may be any system that allows a user 6 to turn the at least one directional wheel 4 without interfering with the transmission system 7. The steering system may also allow a user 6 to change the orientation of the at least one directional wheel 4 without moving the at least one handle 73 substantially away from the sagittal plane of the rider and the vertical longitudinal plane of the vehicle 5. One embodiment of a steering system that may be used with the transmission system 7 is described below and includes a converter assembly 2 and a control assembly 3.

The Converter Assembly

Figure 9:
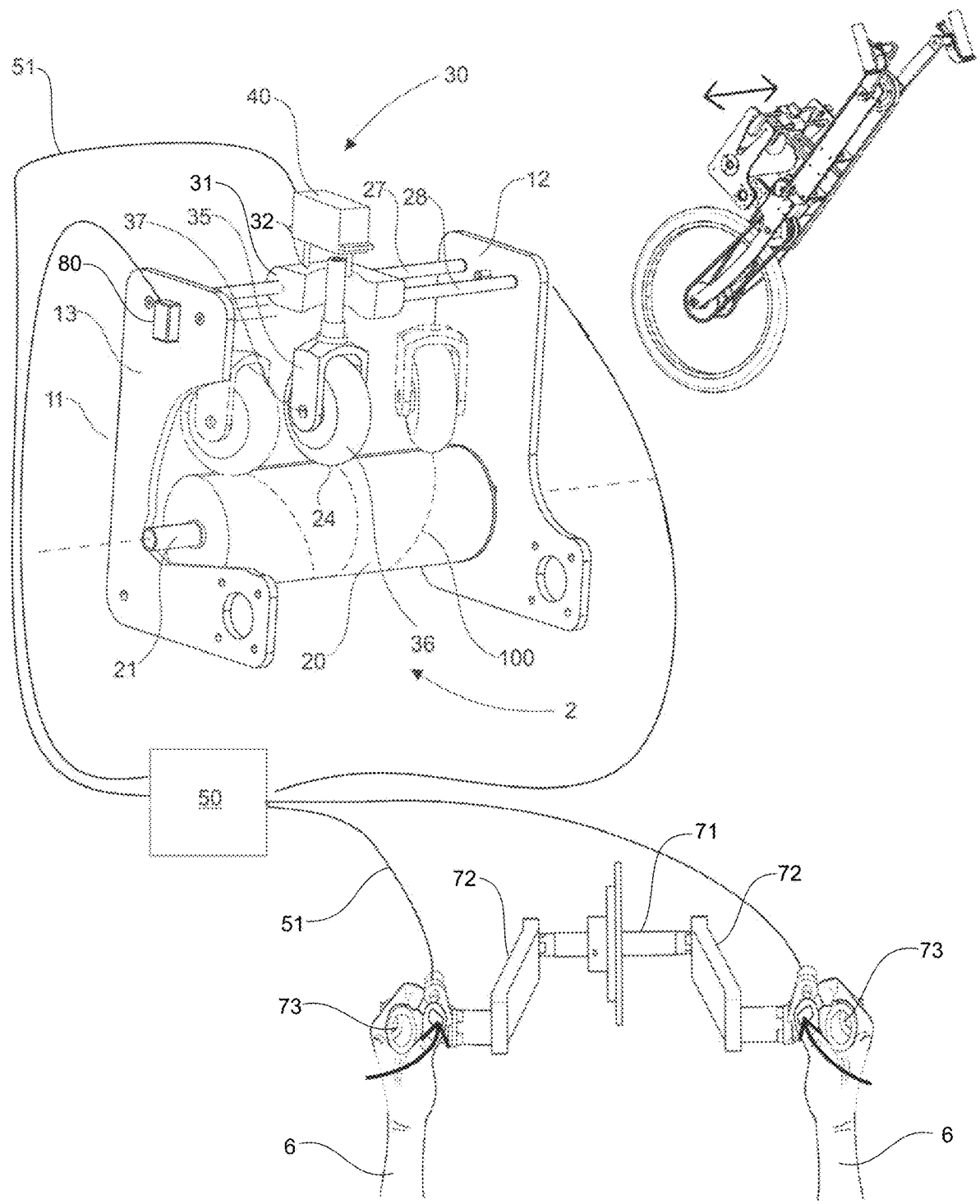
FIG. 9 is a perspective schematic illustration showing a steering system, with some cutaways showing the components and arrows with dotted lines indicating direction of motion.
Figure 13:
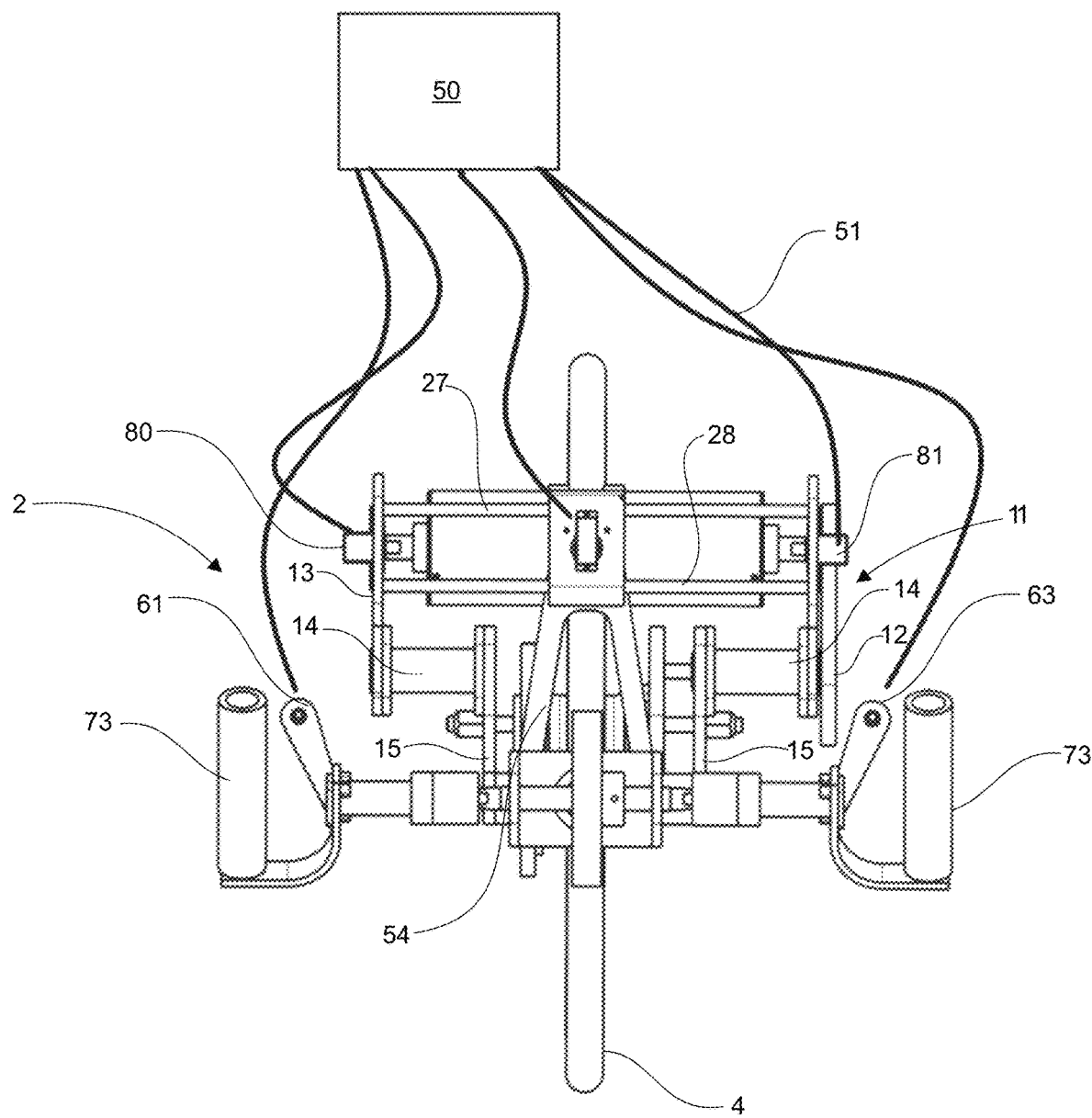
FIG. 13 is a top view illustration of the steering system mounted on a vehicle showing a control system.
Figure 14:
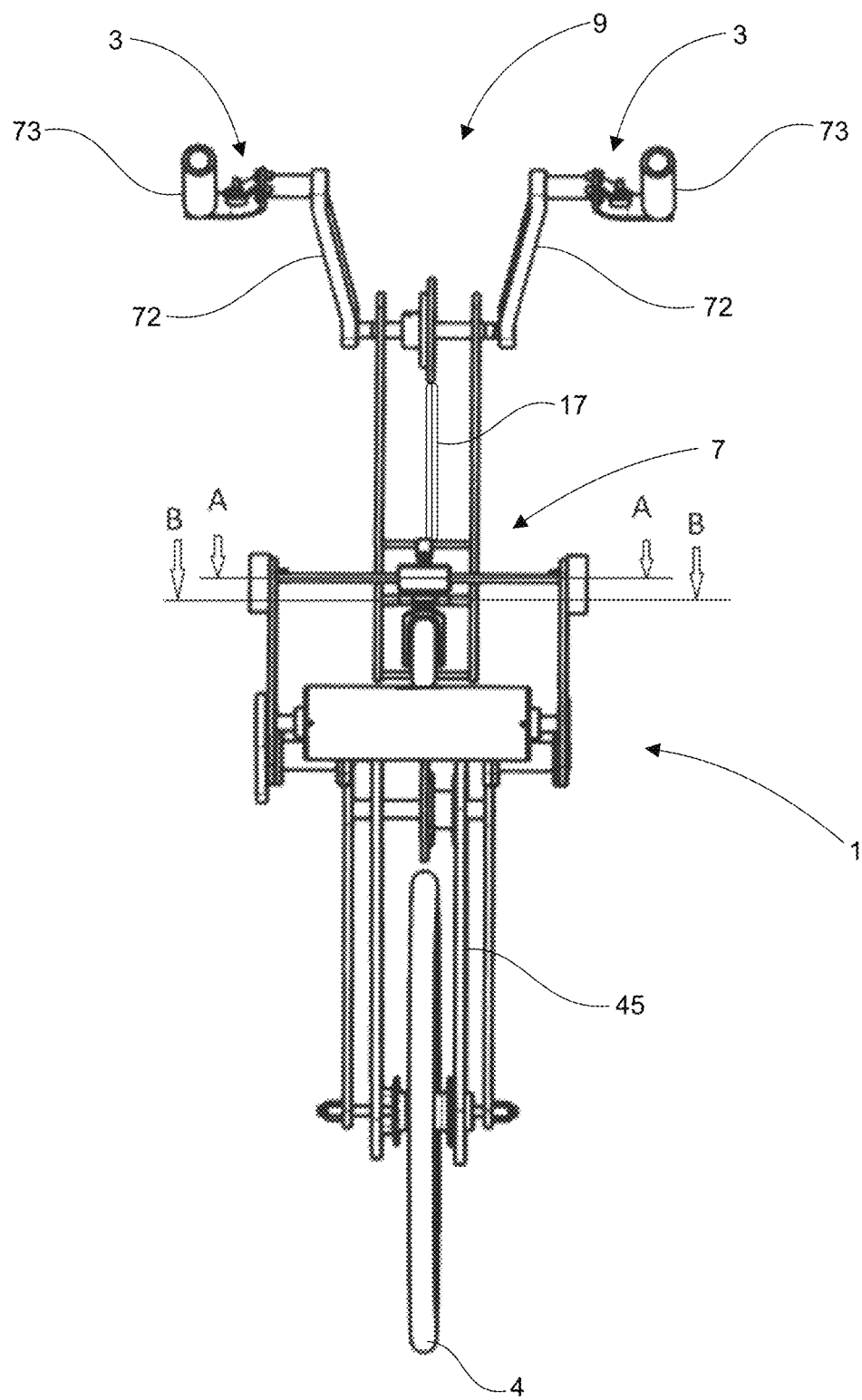
FIG. 14 is a front view illustration of a steering and transmission systems.
Figure 15:
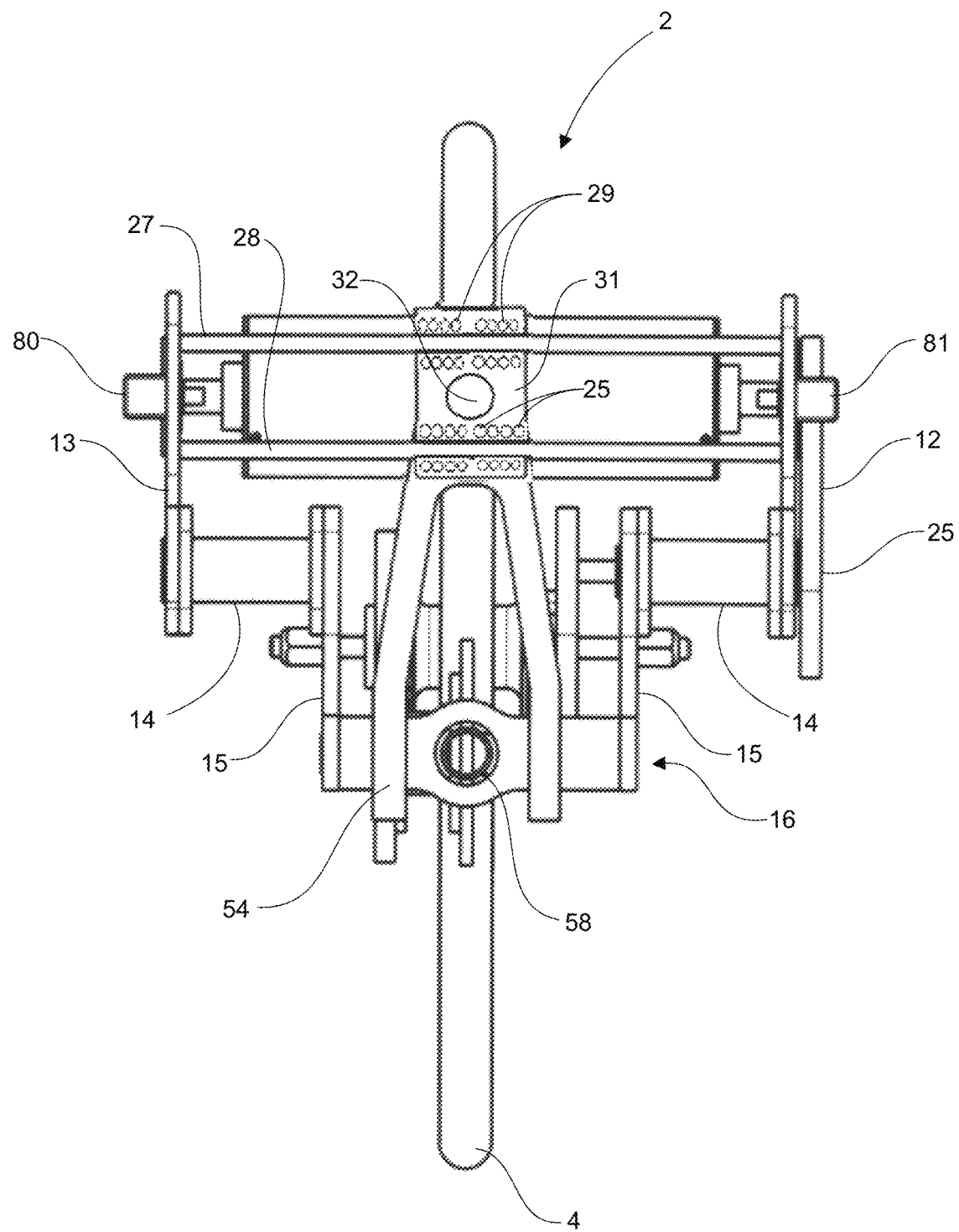
FIG. 15 is a top sectional elevation illustrating the position of the slide assembly while the vehicle is proceeding in a straight forward direction.
Figure 16:
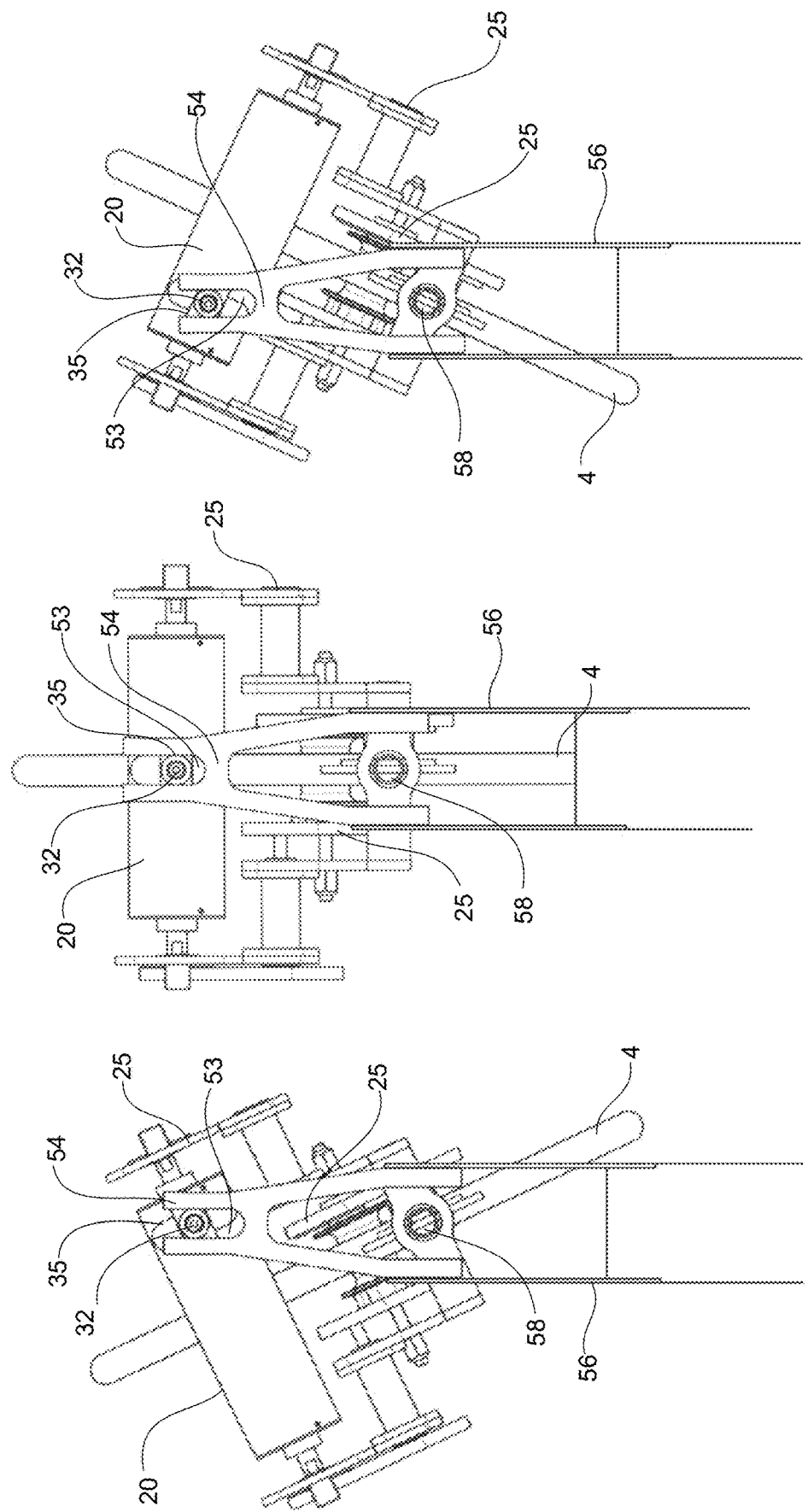
FIG. 16 is a top sectional elevation illustrating the slotted coupling and the friction wheel while the vehicle is turning left (left hand illustration), moving in a straight forward direction (middle illustration) and turning right (right hand illustration)
Figure 17:
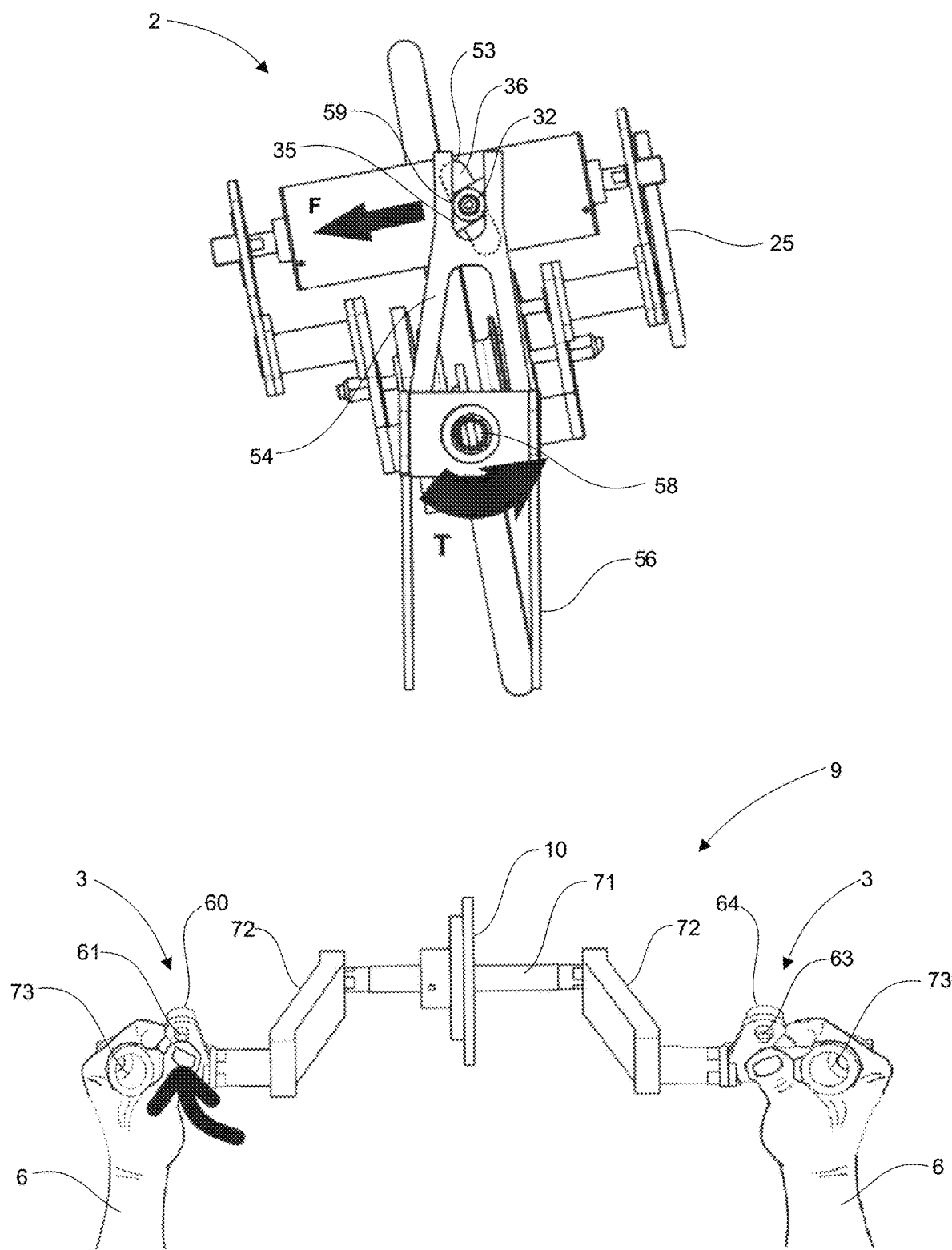
FIG. 17 is a top sectional elevation illustrating the angular position of the friction wheel (the arrows indicate lateral force (F) and steering torque (T)) and the manual control while the vehicle is in an initial phase of a left turn (arrow indicates the user manually activating the button)

One embodiment of a converter assembly is shown in FIGS. 9 and 13. The illustrated converter assembly 2 comprises a support frame 11 formed by a pair of substantially parallel brackets 12, 13. The brackets 12, 13 are secured to a crosspiece 14 forming part of a forwardly projecting extension 15 of the vehicle fork assembly 16. The fork assembly rotatably supports the at least one directional wheel 4 and pivots on column 58, around axis 57, thereby providing steering. The support frame 11 serves to mount the converter assembly componentry to the vehicle 5. In the embodiment shown, the converter assembly 2 is positioned to extend transversely over the vehicle's at least one directional wheel 4.

An elongate cylinder 20 is rotationally mounted to and extends between the frame brackets 12, 13. It is supported on a longitudinal axle 21 journaled in bearings 22, 23 which are mounted in the frame brackets 12, 13. The cylinder 20 provides a rotative outer surface 24.

The cylinder 20 is rotationally driven by a source of rotational drive associated with the vehicle 5. For example, a chain and sprocket assembly 25 is connected to and between the hub 26 of the rotating at least one directional wheel 4 and the cylinder 20. It functions to rotatably drive the cylinder 20 when the vehicle 5 is advancing.

A guide assembly 8, comprising a pair of linear guide rods 27, 28, is connected between and to the frame brackets 12, 13. The guide rods 27, 28 extend parallel to and in constant spaced relation relative to the longitudinal rotative outer surface 24 of the cylinder 20. They extend perpendicularly relative to the direction of rotational movement of the cylinder outer surface 24 and serve to maintain a slide assembly 30 moving therealong in a constant, outwardly spaced relation relative to said cylinder surface.

The slide assembly 30 comprises a body 31 slidably mounted on the guide rods 27, 28 by bearings 29 for rectilinear movement therealong.

A downwardly projecting, pivotable stem 32 extends from the slide body 31 and is supported for rotation therein by bearings 33. At its lower end, the stem 32 has a fork 35 rotatably supporting a friction wheel 36. The friction wheel 36 is mounted on an axle 37 and is supported in bearings 38 carried by the fork 35. The stem 32 is aligned normal to the cylinder's rotative outer surface 24 and is positioned so as to press the rim of the friction wheel 36 firmly against said outer surface.

In summary, the stem 32 is associated with the slide assembly 30, moves with it and is functionally connected with the friction wheel 36. The stem 32 serves to turn and orient the friction wheel 36. The guide assembly 8 preferably guides friction wheel 36 perpendicularly to the direction of movement of the cylinder's rotative outer surface 24. It frictionally engages the cylinder's outer surface 24 and therefore will rotate with it as a rotationally coupled unit.

A servo motor 40 is mounted to the body 31 of the slide assembly 30. The motor's output shaft 77 is operatively connected to the stem 32 so as to turn it. When actuated, the servo motor 40 functions to provide controlled angular positioning or rotation to the stem 32 and thereby turns and angles the rim of friction wheel 36 relative to the direction of movement of the rotative outer surface 24. When so angled and rotating, the friction wheel 36 will advance laterally along a helical path on the rotating outer surface 24 of the cylinder 20. This is illustrated in broken lines in FIG. 9. The servo motor 40 therefore serves as part of an actuation means for providing variable and controlled angular position to the stem 32 and friction wheel 36 to turn and orient said wheel.

As shown in FIG. 9, the rolling path of contact between the friction wheel 36 and the cylinder 20 repeatedly begins and ends at the same position when the rim of friction wheel 36 is parallel to the direction of movement of the rotative outer surface 24. In this circumstance, friction wheel 36 generates lateral force providing torque to hold the at least one directional wheel 4 steady either in a straight-ahead position or in a constant curve position.

When the rim of friction wheel 36 is angled relative to the direction of movement of the rotative outer surface 24, the rolling path of friction wheel 36 is helical in nature. When so rotating, the angled friction wheel 36 causes the slide body 31 to move rectilinearly along the guide rods 27, 28; the friction wheel 36 thereby generates lateral force on cylinder 20 (as indicated by the arrows in FIGS. 17 to 21) which produces torque for turning the at least one directional wheel 4 in the course of steering the vehicle 5. The direction of movement of the slide body 31 will dictate whether the at least one directional wheel 4 turns clockwise or counterclockwise.

The rate of the sliding movement of the slide body 31 along the guide rods 27, 28 is controlled by the magnitude of the angular position of the friction wheel 36 and by the rate of driven rotation of the cylinder 20. The direction of the angular positioning of the servo motor 40 output causes the friction wheel 36 to move laterally in either the left or right direction.

The linear movement of the slide body 31 along the guide rods 27, 28 is converted to circular movement applied with torque to turning of the at least one directional wheel 4 by use of a slotted coupling 54. More specifically, a slot 53, which encompasses the stem 32, is provided at the front end of a slotted coupling 54. The slotted coupling 54 is mounted rigidly to parallel brackets 34 and frame 56. The stem 32 contains bearing races 59 connecting the stem 32 with the slotted coupling 54. This arrangement enables the stem 32 to rotate freely within the slotted coupling 54 under impetus from the motor 40, so as to pivot the friction wheel 36 and provide lateral turning force on the rotative outer surface 24 of the cylinder 20; the slide body 31 moves along the cylinder 20 left or right, thereby turning the fork assembly 16 and the at least one directional wheel 4 attached to it.

In the operation of the converter assembly 2, the following features and actions are involved:

the support frame 11, guide rods 27, 28, slide assembly 30 and stem 32 combine to constrain and position the friction wheel 36 in frictional engagement with the rotating cylinder's outer surface 24, so that the friction wheel 36 and cylinder 20 rotate together as a unit and provide rotational input to the converter assembly 2;

the slide assembly 30 and guide rods 27, 28 enable the rotating friction wheel 36, when angled, to advance helically around the rotating cylinder 20;

if the friction wheel 36 is angled, the slotted coupling 54, connecting the moving friction wheel 36 and slide assembly 30 with the at least one directional wheel column 58, communicates a lateral force, generated by the interaction between the friction wheel 36 and the moving cylinder 20, to the fork assembly 16 and the at least one directional wheel 4 in the form of applied torque, thereby turning the at least one directional wheel 4 this is illustrated in FIGS. 17, 18, 19, 20 and 21;

the friction wheel 36 is connected to the pivotable stem 32 and therefore their orientation can be varied by aligning torque applied to them by the servo motor 40; and as a consequence, a small aligning torque applied to the stem 32 can vary the angular position or orientation of the friction wheel 36 to thereby control the direction, velocity and acceleration of the friction wheel movement along the cylinder 20 and produce the relatively large force needed to turn the at least one directional wheel 4.

In summary, a converter assembly 2 is provided which can convert rotational input into variable linear and lateral force. The force is utilized to apply torque to steer the at least one directional wheel 4. The elongate and lengthy nature of the cylinder 20 promotes amplification.

The Control Assembly

In one embodiment the control assembly 3 is operatively coupled with the converter assembly 2 to provide angular position input to the converter's stem 32.

It is intended, as a preferred outcome, to turn the friction wheel 36 at an angle and in the same direction as the input applied to the left button 61 and the right button 63 by the user 6. This is accomplished by the illustrated control assembly 3, as shown in schematic FIG. 10.

Figure 10:
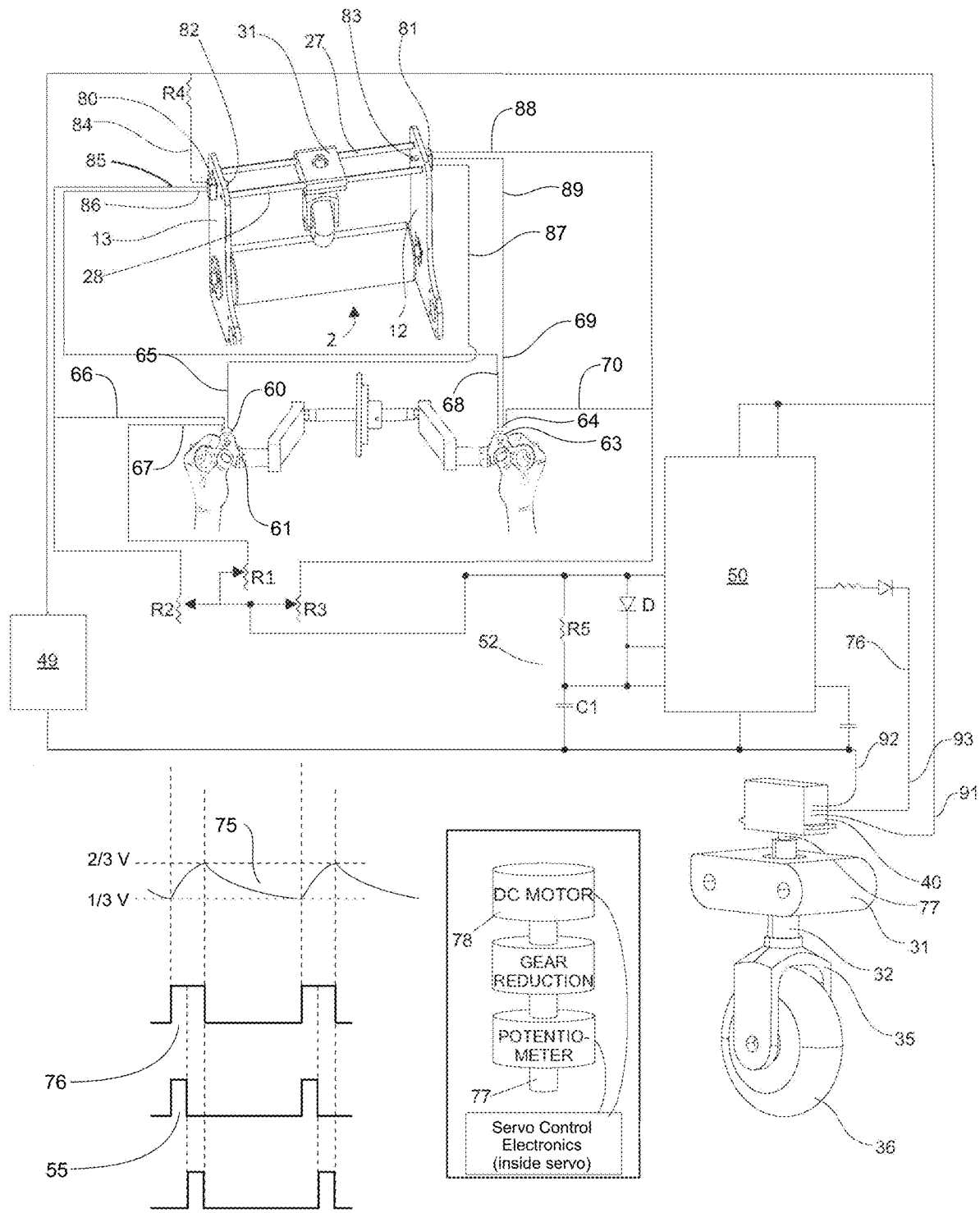
FIG. 10 is a mechatronic illustration of a control system.
Figure 11:
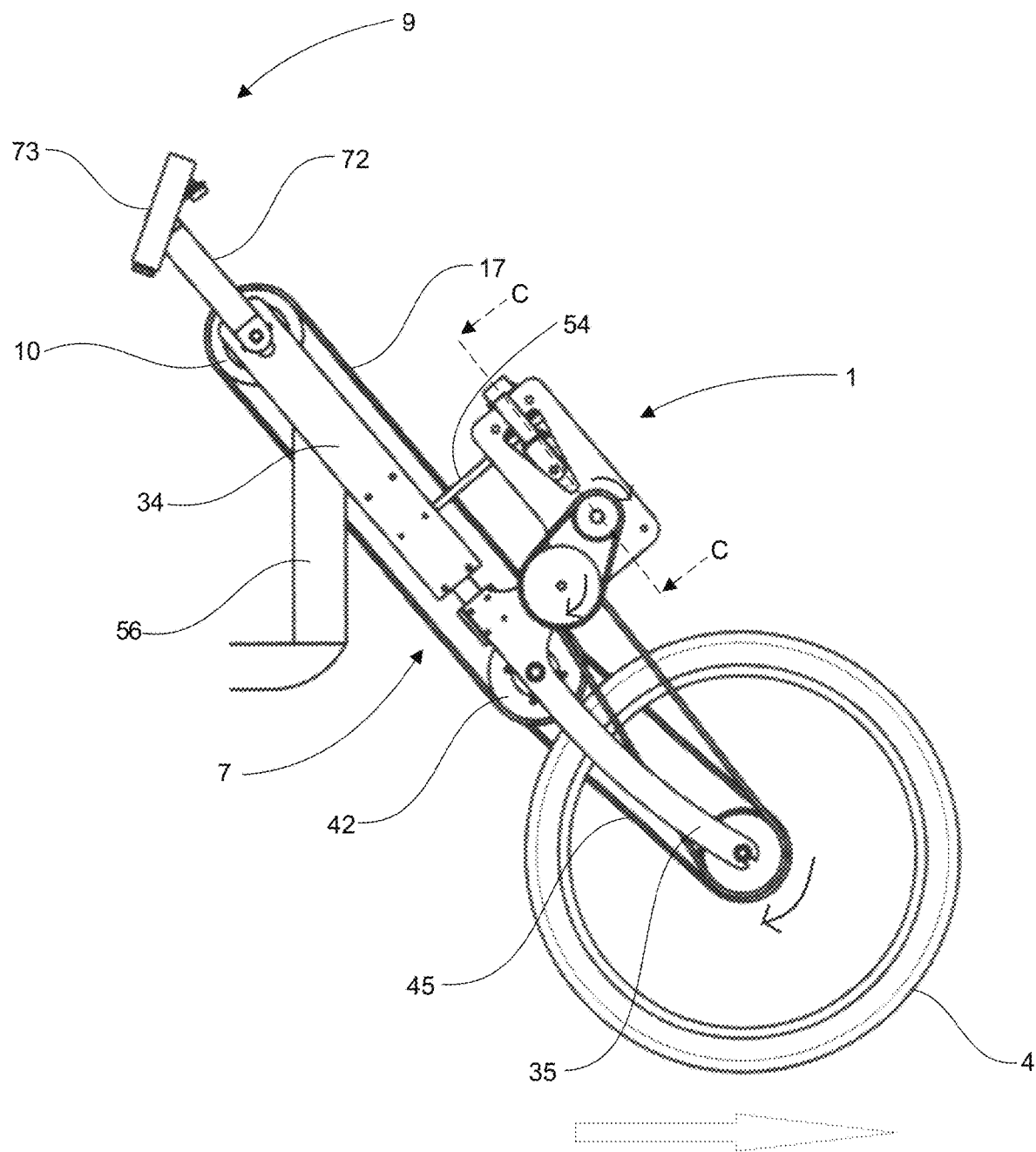
FIG. 11 is a side view illustration of a transmission and steering system showing the rotation of the chain assembly for the convertor.
Figure 12:
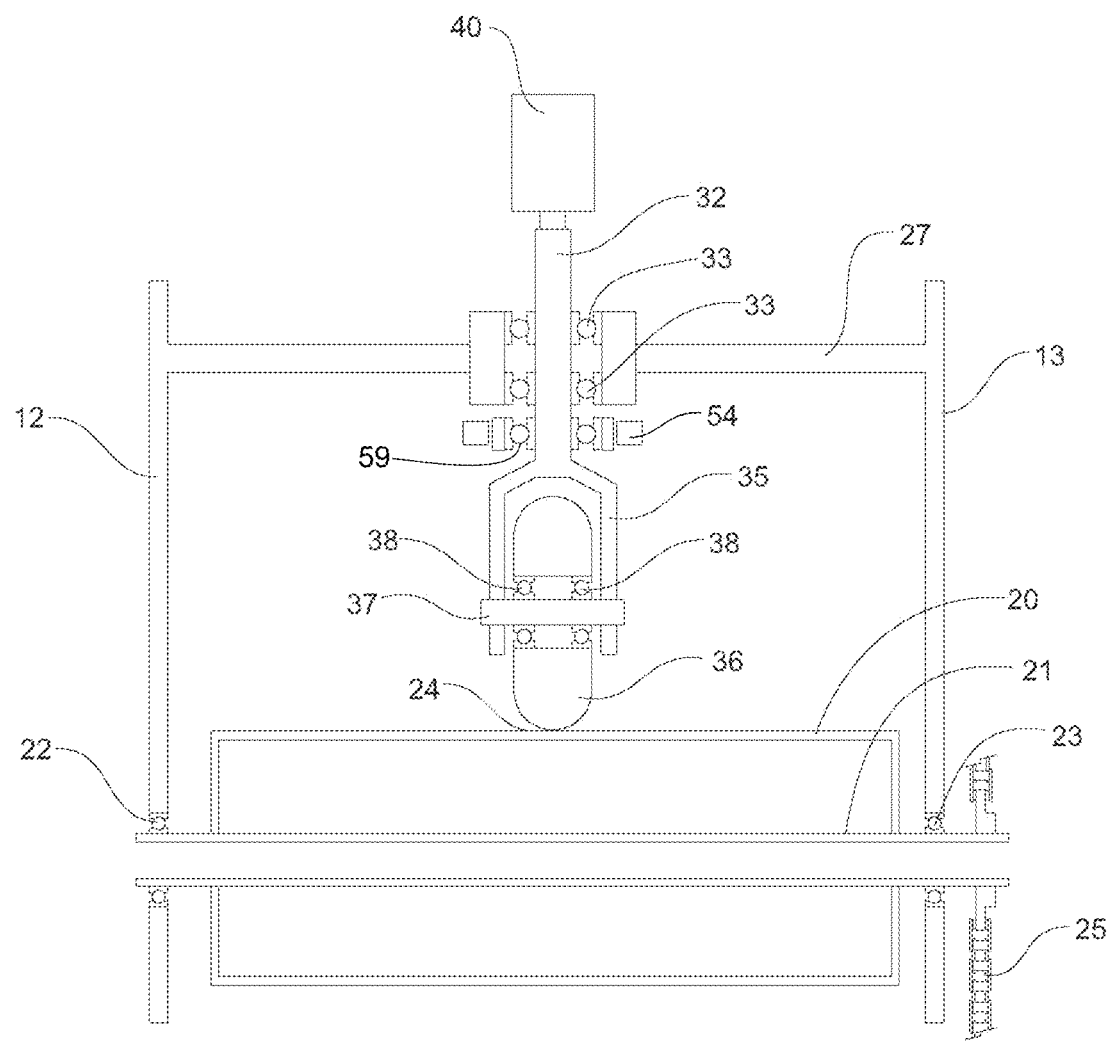
FIG. 12 is a cross cut illustration of the convertor assembly of FIG. 11.

Having reference to FIG. 10 buttons 61 and 63 are provided. Left button 61 activates switch 60 and right button 63 activates switch 64.

While the use of left and right buttons is preferred, in alternate embodiments, such as is shown in FIG. 24, the manually operated control assembly 3 may include levers instead of buttons to provides control of steering system 1.

As shown in FIG. 10, limit switches 80, 81 are mounted on the frame brackets 12, 13 and serve to provide means for indicating when slide body 31 has reached the end of travel along guide rods 27, 28. When the slide body 31 has reached the end of the travel on the left, button 82 is pressed and when it comes to the end of travel on the right, button 83 is pressed. Button 82 activates limit switch 80 and button 83 activates limit switch 81.

The limit switches 80, 81 provided have double throw single pole contacts. Left limit switch 80 and right limit switch 81 each have three terminals 84, 85, 86 and 87, 88, 89 respectively. When the slide body 31 is not pressing on button 82 or 83, terminals 84 and 86 are connected, terminals 87 and 89 are connected and terminals 85 and 88 are not connected. When slide body 31 is pressing on left button 82, terminals 84 and 85 are connected and terminal 86 is not connected. When slide body 31 is pressing on right button 83, terminals 88 and 89 are connected and terminal 89 is not connected.

The switches 60, 64 provided have double throw single pole contacts. Left switch 60 and right switch 64 each have three terminals 65, 66, 67 and 68, 69, 70 respectively. When the user is not manually pressing on button 61 or 63, terminals 65 and 67 are connected, terminals 68 and 69 are connected and terminals 66 and 70 are not connected. When the left button 61 is manually pressed terminals 65 and 66 are connected and terminal 67 is not connected. When the right button 63 is manually pressed terminals 68 and 70 are connected and 69 is not connected.

A battery 49 is provided to apply battery voltage through resistor R4, terminals 84 and 86 of limit switch 80, terminals 68 and 69 of right switch 64, terminals 87 and 89 of limit switch 81 and terminals 65 and 67 of left switch 60. A voltage on terminal 48, which varies when right button 63 or left button 61 is activated, passes through diode D and begins to charge capacitor C1, increasing the voltage on it, through a period of time. The voltage is indicative of the position of variable resistor R1 and determines the amount of time required to store energy in capacitor C1. A 555 astable oscillator circuit 50 provides means to charge and discharge the capacitor C1, to thereby produce a saw-tooth voltage profile 75 and a pulse width modulated (PWM) control signal 76, as illustrated in FIG. 10. The on-time of the PWM control signal 76 is indicative of the position of variable resistor R1.

A servo motor 40, available from HITEC RCD and designated model HS-B2MG, is utilized. The servo motor 40 has three terminals 91, 92 and 93 connected to the oscillator circuit 50. Battery 49 provides a fixed voltage to terminal 91 and ground to terminal 92. Terminal 93 is connected to PWM control signal 76. Included inside the servo motor 40 is a "proportional control closed loop" system providing means to precisely position the motor's angular output shaft 77 to a desired angle. Typically, a PWM control signal 55 indicative of the angle of the output shaft 77 is provided by internal circuitry ranging from about 0.9 milliseconds to 1.5 milliseconds "on time". Internal circuitry is provided to calculate the difference between the on-time of the PWM control signal 55 and the on-time of the servo PWM signal 76. The difference powers the internal DC motor 78 in a direction to reduce the difference to zero. A large difference results in rapid rotation of the DC motor 78 while a small difference results in slower rotation achieving proportional control and precise positioning of the angle of the output shaft 77 of servo motor 40.

The left button 61 and right button 63 provide a means to position the friction wheel. In straight ahead or constant turning situations neither button is activated (pressed). The voltage on terminal 48 is determined by the position of variable resistor R1. When left button 61 is activated, the voltage on terminal 48 is determined by the position of variable resistor R2, and when the right button 63 is activated the voltage on terminal 48 is determined by the position of variable resistor R3. Resistor R1, R2 and R3 are manually adjusted to control the angle of servo motor 40.

The limit switches 80 and 81 provide a means to override the user control when slide body 31 moves to the left or right limits. When slide body 31 moves to the left, resistor R2 controls the angle of the friction wheel 36. When slide body 31 moves to the right, resistor R3 controls the angle of the friction wheel 36. Resistors R2 and R3 position servo motor 40 to move slide body 31 away from the left or right limits.

As previously stated, the servo motor 40 is rotationally coupled, through its output shaft 77 connection with the stem 32, to the friction wheel 36.

In summary, the activation of the left button 61 or right button 63 produces a change in the position of friction wheel 36 through the workings of the components of the control assembly 3. The position of R2 determines the position of friction wheel 36 when left button 61 is activated and the position of R3 determine the position of friction wheel 36 when right button 63 is activated.

Operation of the Steering System

In the course of operation of the embodiment of the steering system specifically described herein, timed manipulation of left button 61 and right button 63 actuates the steering system 1 to control and vary the direction and extent of turning of the at least one directional wheel 4. The rate of turning is determined by position of R2 and R3.

This is accomplished by the components of the control assembly 3 working together in series to produce an angular position of the servo motor output shaft 77 that controls and directs the operation of the converter assembly 2 to provide steering of the at least one directional wheel 4.

In greater detail, the following steps are practiced by the described embodiment:

- manual manipulation of the left button 61 and right button 63 produces mechanical movement of switches 60 and 64;
- the mechanical movement of the switch contacts (not shown) inside switches 60 and 61 determines the resistive elements between the battery voltage 49 and terminal 48. When left switch 60 is activated R4 is connected in series with R2, when right switch 64 is activated R4 is connected in series with R3. When neither button is activated R4 is connected in series with R1;
- the electric voltage potential emanating from the terminal 48 is electrically connected to the resistor—capacitor circuit 52 working in conjunction with the astable oscillator circuit 50 and effects a modulation of the voltage potential, to produce an output of repetitive pulses. The oscillator circuit 50 generates repetitive pulses with the on-time of each pulse being about 1500 microseconds long when the left button 61 or right button 63 are not activated, decreasing the on-time when the left button 61 is activated and increasing the on-time when the right button 63 is activated;
- the servo motor 40 uses the information contained in the repetitive pulses 76 produced from the oscillator circuit 50 and provides angular position of its output shaft 77, maintaining it in the middle of its total range of about 270 degrees when the on-time of the pulse about 1500 microseconds, rotating it clockwise as the on-time of the pulse decreases and rotating it counter-clockwise as the on-time of the pulse increases;
- the servo motor output shaft 77 is coupled to the stem 32. The stem 32 mechanically supports the friction wheel 36, so that it maintains constant frictional contact with the rotative outer surface 24 of the cylinder 20, and it causes the friction wheel to pivot and follow a path 100 on the rotating cylinder surface. The stem angle applied controls the nature of the path and varies the distance between the start and end points of the path through each revolution of the cylinder 20. When the friction wheel 36 is angled, continuous revolution of the cylinder 20 produces a path 100 that is helical in nature so that the friction wheel 36 advances linearly and laterally along the cylinder 20;
- the rate of spinning of the cylinder 20, which is coupled to the at least one directional wheel 4, is affected by the rate of the vehicle speed; as a consequence, the friction wheel 36 moves slowly along the cylinder when the vehicle is moving slowly and quickly when the vehicle is moving quickly;
- the slide body 31 is coupled by the slotted coupling 54 with the directional wheel column 58, to thereby provide turning of the at least one directional wheel 4. The slotted coupling 54 functions to hold the at least one directional wheel 4 in a straight-ahead direction when the friction wheel 36 is centrally located on the cylinder 20; it turns the at least one directional wheel 4 clockwise as it advances to the left and turns it counter-clockwise as it advances to the right.

In summary, the buttons 61 and 63 activation controls the rate at which the friction wheel 36 advances along the cylinder 20 by altering the width of the helical travel path 100. Pushing on the right button 63 causes the friction wheel 36 to travel left along the cylinder 20 and turns the at least one directional wheel 4 to the right. Pushing on the left button causes the friction wheel 36 to travel right along the cylinder 20 and turns the at least one directional wheel 4 to the left. At any time, if the right button 63 and the left button 61 are not activated, the friction wheel 36 stops advancing and holds the at least one directional wheel 4 at its current position.

The Vehicle-Assembly

Figure 1:
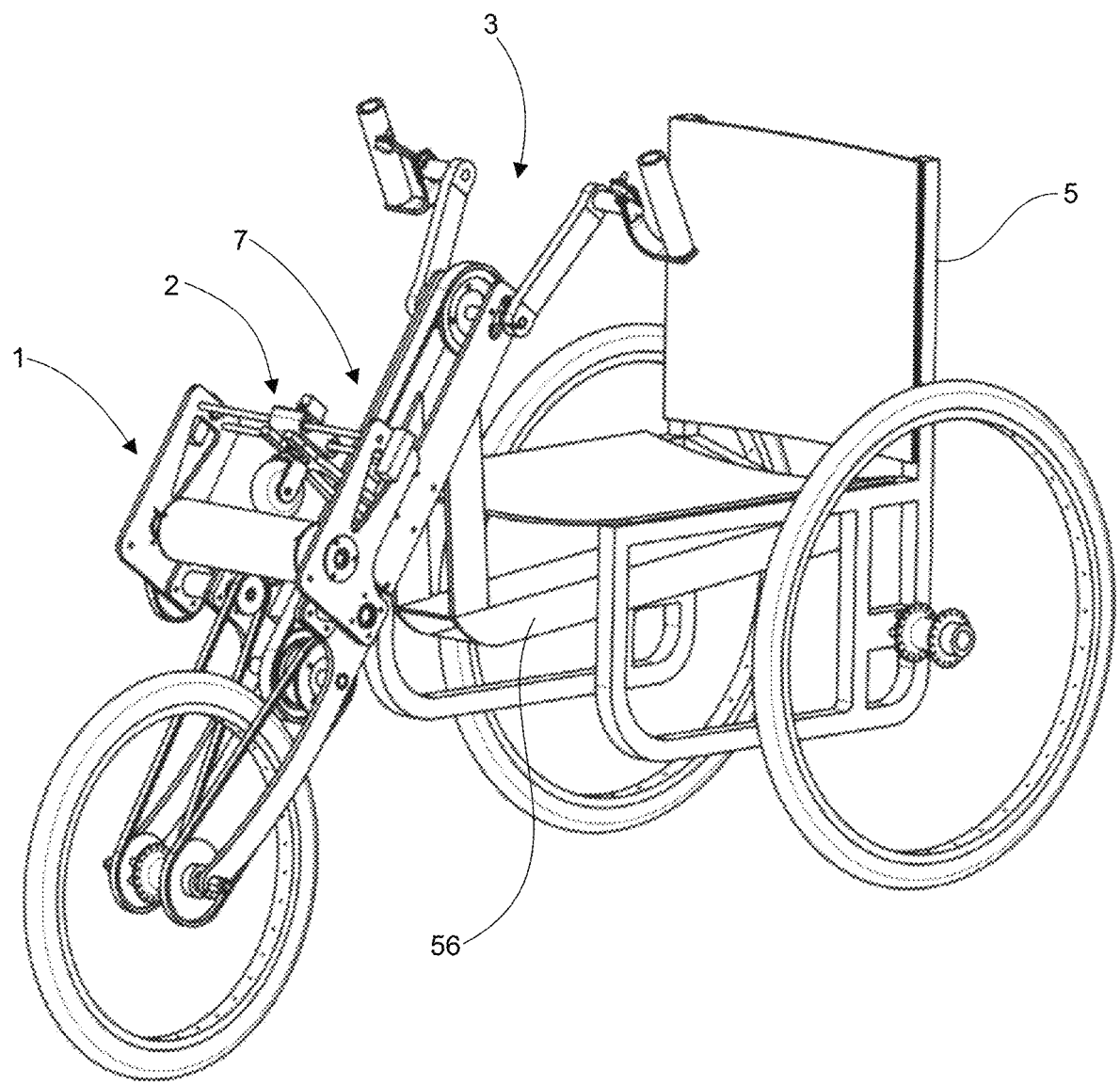
FIG. 1 is a projection illustration of one embodiment of a transmission system and a steering system mounted to a manually powered vehicle.

The steering system 1 is one example of a steering system that can be used with the power transmission system 7. FIG. 1 is one example of how the steering system 1 can be mounted to a user-powered vehicle 5. The vehicle 5 is equipped with a transmission system 7, which enables the user 6 to manually propel the vehicle 5. The steering system 1 enables the user 6 to actuate and control turning and orientation of the at least one directional wheel 4, to thereby steer the vehicle 5.

Example

Figure 22:
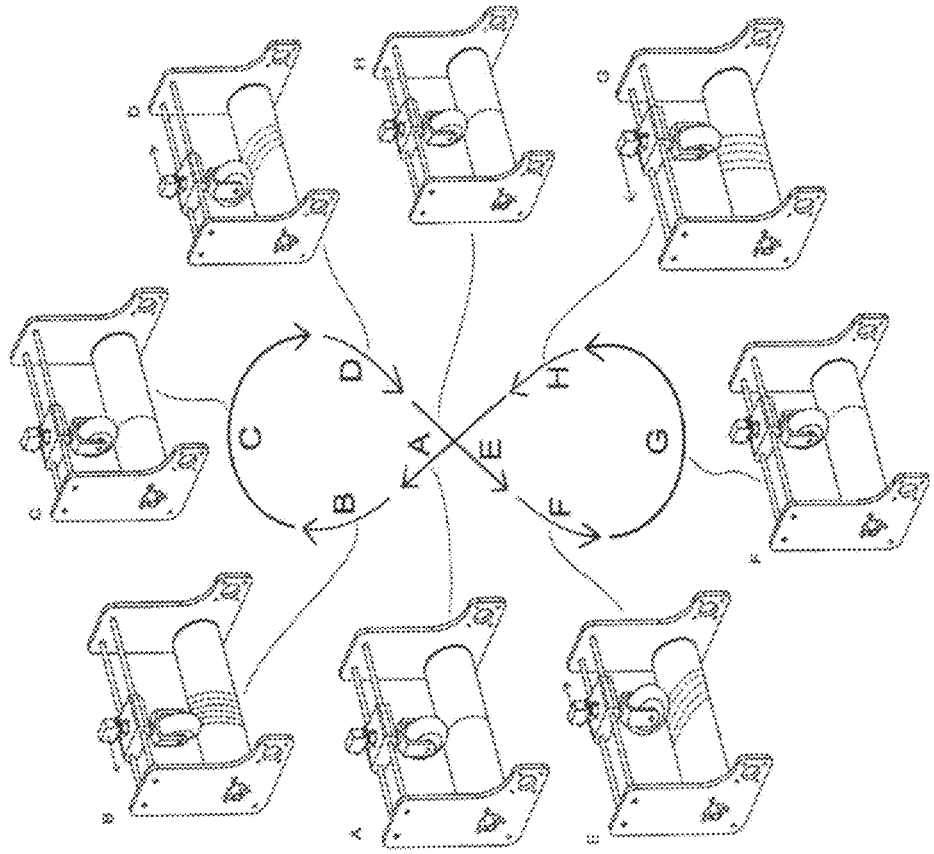
FIG. 22 is an illustration of a figure eight path followed by the vehicle in association with the example described—DW indicates at least one directional wheel, CW indicates clockwise, CCW indicates counter-clockwise, and FW indicates friction wheel.

One embodiment of a steering system 1, as previously described herein, provides the following steering options when operationally mounted to the vehicle 5, as shown in FIGS. 12-21:

a) by not activating left button 61 or right button 63, the rim of the friction wheel 36 is parallel to the direction of rotational movement of the cylinder outer surface 24 and turning of the at least one directional wheel 4 is not occurring—the at least one directional wheel 4 traces a constant path on the ground and the status is static;

b) by activating either the left button 61 or right button 63, the rim of friction wheel 36 and the direction of rotational movement of the cylinder outer surface 24 are angled to each other, the friction wheel 36 advances at a constant rate along the cylinder 20, there is constant progression of turning of the at least one directional wheel 4, the vehicle path radius is changing, and the status is dynamic; and FIG. 22 describes the operation of the steering system in connection with following a figure eight travel path.

While the Figures show the power transmission system 7 used with a hand powered tricycle, it is contemplated that this power transmission system 7 could be used with other types of vehicles, where the front wheel is being manually driven as well as controlling steering.

The foregoing description of embodiments and examples of the disclosure has been presented for purposes of illustration and description. It is not intended to be exhaustive or to limit the disclosure to the forms described. Numerous modifications are possible in light of the above teachings. Some of those modifications have been discussed and others will be understood by those skilled in the art.

The embodiments were chosen and described in order to best illustrate the principles of the disclosure and various embodiments as are suited to the particular use contemplated. The above description of the embodiments of the invention is not intended to be exhaustive or to limit the invention to the precise form disclosed above or to the particular field of usage mentioned in this disclosure. The elements and acts of the various embodiments described above can be combined to provide further embodiments.

The scope of the disclosure is, of course, not limited to the examples or embodiments set forth herein, but can be employed in any number of applications and equivalent devices by those of ordinary skill in the art. Rather it is hereby intended the scope of the invention be defined by the claims appended hereto. Also, for any methods claimed and/or described, regardless of whether the method is described in conjunction with a flow diagram, it should be understood that unless otherwise specified or required by context, any explicit or implicit ordering of steps performed in the execution of a method does not imply that those steps must be performed in the order presented and may be performed in a different order or in parallel.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification. Accordingly, the actual scope of the invention encompasses not only the disclosed embodiments, but also all equivalent ways of practicing or implementing the invention.

What is claimed is:

1. A power transmission system for powering a vehicle, the power transmission system comprising:
   a power transfer assembly comprising at least one handle and at least one crank arm;
   a side flex chain assembly comprising:
      a crank shaft functionally connected to the power transfer assembly wherein when the power transfer assembly is engaged torque is transferred to the crank shaft;
      a crank sprocket rigidly connected to the crank shaft;
      a side flex chain sprocket rigidly connected to a rod; and
      a side flex chain that engages the crank sprocket and the side flex chain sprocket; and
   at least one direction wheel functionally connected to the side flex chain assembly;
   wherein, torque resulting from movement of the power transmission assembly is transmitted through at least the side flex chain to the at least one directional wheel and propels the vehicle and wherein when the at least one directional wheel moves from the straight-ahead direction the side flex chain twists without disengaging from the crank sprocket or the side flex chain sprocket, and
   wherein the at least one handle rotates in a circular motion substantially within the vertical longitudinal plane of the vehicle when the vehicle is turning away from the straight-ahead direction.

2. The power transmission system of claim 1, wherein the side flex chain comprises individual chain elements having bushings with convex inner surfaces.

3. The power transmission system of claim 1, wherein there is a first axis defined by the line connecting the axis of rotation of the crank sprocket with the axis of rotation of the side flex chain sprocket and wherein the first axis is substantially perpendicular to the axis of rotation of the crank sprocket and the axis of rotation of the side flex chain sprocket.

4. A vehicle comprising:
   the power transmission system of claim 1; and
   a steering system, wherein the steering system moves the at least one directional wheel out of the straight-ahead direction without moving the power transfer assembly substantially out of the vertical longitudinal plane.

5. The vehicle of claim 4 wherein the steering system comprises:
   a rotary to variable linear converter assembly comprising a rotatable cylinder, having an outer surface, and a rotatable pivotable friction wheel contacting said outer surface so that they will rotate together as a coupled unit;
   said converter assembly further comprising guide means, for constraining and guiding movement of the friction wheel along the cylinder outer surface, and a slide assembly connected to and moveable along the guide means;
   the slide assembly having a rotatable stem connected with the friction wheel for pivotally varying the friction wheel's orientation;
   the slide assembly and friction wheel forming a moveable assembly connected with the at least one directional wheel for turning it;
   a source of rotational drive connected with the coupled unit for driving it; and
   user controllable means, connected with the stem, for actuating rotation of the stem to vary the friction wheel orientation for the purpose of steering the at least one directional wheel.

6. The vehicle as set forth in claim 5 wherein the controllable means is manually operable.

7. The vehicle as set forth in claim 6 wherein the friction wheel is positioned normal to the cylinder's outer surface and is moveable across the direction of movement of said outer surface when the cylinder is rotating.

8. A system for driving and steering a rotatable and pivotable at least one directional wheel of a vehicle, comprising:
   a power transfer assembly;
   a side flex chain assembly comprising;
      a crank shaft functionally connected to the power transfer assembly wherein when the power transfer assembly is engaged torque is transferred to the crank shaft;
      a crank sprocket rigidly connected to the crank shaft;
      a side flex chain sprocket rigidly connected to a rod; and
      a side flex chain that engages the crank sprocket and the side flex chain sprocket;
   at least one direction wheel functionally connected to the side flex chain assembly;
   a rotary to variable linear converter assembly mountable to the vehicle and connectable to the at least one directional wheel for steering said wheel when it is rotating by generating lateral force to provide torque for holding said wheel steady or turning it;
   said converter assembly comprising a rotatable cylinder and a guided, laterally moveable, pivotable and rotatable friction wheel maintained in contact with the cylinder's surface so that they rotate together; and
   manually controlled means connected with the friction wheel for turning or holding steady the friction wheel relative to the axis of the cylinder;
   wherein, torque resulting from movement of the power transfer assembly is transmitted to the at least one directional wheel through at least the side flex chain and propels the vehicle.

* * * * *